United States Patent [19]
Nagasaki et al.

[11] Patent Number: 5,936,619
[45] Date of Patent: *Aug. 10, 1999

[54] INFORMATION PROCESSOR

[75] Inventors: Katsuhiko Nagasaki, Ichikawa; Kazutoshi Shimada, Yokosuka; Eisaku Tatsumi, Yokohama; Noriyuki Suzuki, Tokyo; Shinichi Sunakawa, Kawasaki, all of Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/670,108

[22] Filed: Jun. 25, 1996

Related U.S. Application Data

[63] Continuation of application No. 08/117,771, Sep. 8, 1993, abandoned.

[30] Foreign Application Priority Data

Sep. 11, 1992 [JP] Japan ................................. 4-243487

[51] Int. Cl.⁶ ..................................................... G09G 5/00
[52] U.S. Cl. ........................... 345/205; 345/214; 361/681; 364/709.11
[58] Field of Search ...................................... 345/126, 156, 345/157, 158, 161, 163, 167, 168, 173, 112, 205, 214, 204, 905; 361/680, 686, 681; 178/18, 19; 364/707, 708.1, 709.11

[56] References Cited

U.S. PATENT DOCUMENTS

| | | | |
|---|---|---|---|
| 4,730,186 | 3/1988 | Koga et al. | 178/18 |
| 5,021,720 | 6/1991 | Aimura | 315/370 |
| 5,115,107 | 5/1992 | Crooks et al. | 178/18 |
| 5,134,390 | 7/1992 | Kishimoto et al. | 345/126 |
| 5,148,155 | 9/1992 | Martin et al. | 345/173 |
| 5,189,404 | 2/1993 | Masimo et al. | 345/126 |
| 5,202,844 | 4/1993 | Kamio et al. | 364/709.11 |
| 5,220,652 | 6/1993 | Rowley | 345/156 |
| 5,264,992 | 11/1993 | Hogdahl et al. | 361/686 |
| 5,267,123 | 11/1993 | Boothroyd et al. | 361/680 |
| 5,297,254 | 3/1994 | Arai et al. | 345/157 |
| 5,300,927 | 4/1994 | Arai et al. | 345/157 |
| 5,305,449 | 4/1994 | Ulenas | 345/168 |
| 5,375,076 | 12/1994 | Goodrich et al. | 364/708.1 |
| 5,381,043 | 1/1995 | Kohiyama et al. | 364/708.1 |
| 5,421,590 | 6/1995 | Robbins | 345/161 |
| 5,644,653 | 4/1994 | Sunakawa et al. | 364/709.11 |
| 5,661,632 | 8/1997 | Register | 345/905 |

FOREIGN PATENT DOCUMENTS

| | | |
|---|---|---|
| 0458316 | 11/1991 | European Pat. Off. . |
| 61-232423 | 10/1986 | Japan . |
| WO9107716 | 5/1991 | WIPO . |

OTHER PUBLICATIONS

"Image Orientation Sensing and Correction for Notepads", Research Disclosure, No. 34788, p. 217 (Mar. 1993).

*Primary Examiner*—Amare Mengistu
*Attorney, Agent, or Firm*—Fitzpatrick, Cella, Harper & Scinto

[57] ABSTRACT

An input-output integrated type electronic apparatus is arranged to enable the orientation of a displayed picture to be changed according to the orientation of the apparatus in a used state, whereby the facility with which the apparatus is used is improved. To change the display orientation, the content of a displayed picture is changed on the basis of a detected orientation of the apparatus.

30 Claims, 27 Drawing Sheets

FIG. 4(a)
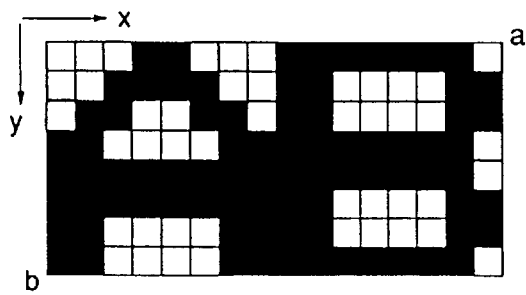
FIG. 4(e)
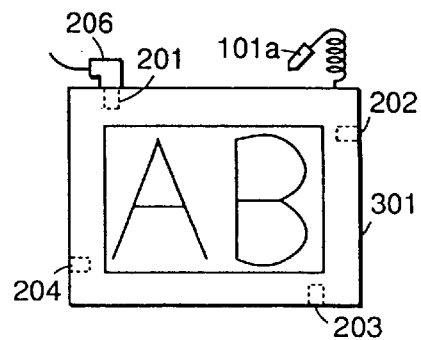
FIG. 4(b)
| ADDRESS | bit 7 | | | | | | | bit 0 | bit 7 | | | | | | | bit 0 | ADDRESS |
|---|---|---|---|---|---|---|---|---|---|---|---|---|---|---|---|---|---|
| 00h | 0 | 0 | 1 | 1 | 0 | 0 | 0 | 1 | 1 | 1 | 1 | 1 | 1 | 1 | 1 | 0 | 01h |
| 02h | 0 | 0 | 1 | 1 | 1 | 1 | 0 | 0 | 1 | 1 | 0 | 0 | 0 | 0 | 1 | 1 | 03h |
| 04h | 0 | 1 | 1 | 0 | 0 | 1 | 1 | 0 | 1 | 1 | 0 | 0 | 0 | 0 | 1 | 1 | 05h |
| 06h | 1 | 1 | 0 | 0 | 0 | 0 | 1 | 1 | 1 | 1 | 1 | 1 | 1 | 1 | 1 | 0 | 07h |
| 08h | 1 | 1 | 1 | 1 | 1 | 1 | 1 | 1 | 1 | 1 | 1 | 1 | 1 | 1 | 1 | 0 | 09h |
| 0ah | 1 | 1 | 1 | 1 | 1 | 1 | 1 | 1 | 1 | 1 | 0 | 0 | 0 | 0 | 1 | 1 | 0bh |
| 0ch | 1 | 1 | 0 | 0 | 0 | 0 | 1 | 1 | 1 | 0 | 0 | 0 | 0 | 0 | 1 | 1 | 0dh |
| 0eh | 1 | 1 | 0 | 0 | 0 | 0 | 1 | 1 | 1 | 1 | 1 | 1 | 1 | 1 | 1 | 0 | 0fh |
FIG. 4(f)
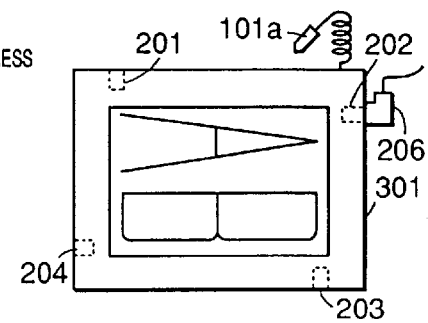
FIG. 4(c)
| ADDRESS | bit 7 | | | | | | | bit 0 | bit 7 | | | | | | | bit 0 | ADDRESS |
|---|---|---|---|---|---|---|---|---|---|---|---|---|---|---|---|---|---|
| 00h | 1 | 1 | 1 | 1 | 1 | 1 | 1 | 1 | 1 | 0 | 0 | 0 | 0 | 0 | 0 | 0 | 01h |
| 02h | 0 | 0 | 0 | 0 | 1 | 1 | 1 | 1 | 0 | 0 | 1 | 1 | 1 | 1 | 0 | 0 | 03h |
| 04h | 0 | 0 | 0 | 0 | 1 | 1 | 1 | 1 | 0 | 0 | 0 | 0 | 1 | 1 | 1 | 1 | 05h |
| 06h | 1 | 1 | 1 | 1 | 1 | 1 | 1 | 1 | 1 | 1 | 1 | 1 | 0 | 0 | 0 | 0 | 07h |
| 08h | 1 | 1 | 1 | 1 | 1 | 1 | 1 | 1 | 1 | 1 | 1 | 1 | 1 | 1 | 1 | 1 | 09h |
| 0ah | 1 | 1 | 0 | 0 | 0 | 0 | 1 | 1 | 1 | 1 | 0 | 0 | 0 | 0 | 1 | 1 | 0bh |
| 0ch | 1 | 1 | 0 | 0 | 0 | 0 | 1 | 1 | 1 | 1 | 0 | 0 | 0 | 0 | 1 | 1 | 0dh |
| 0eh | 1 | 1 | 1 | 1 | 1 | 1 | 1 | 1 | 1 | 1 | 1 | 1 | 1 | 1 | 1 | 1 | 0fh |
FIG. 4(g)
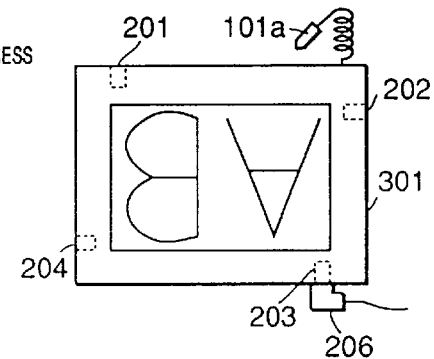
FIG. 4(d)
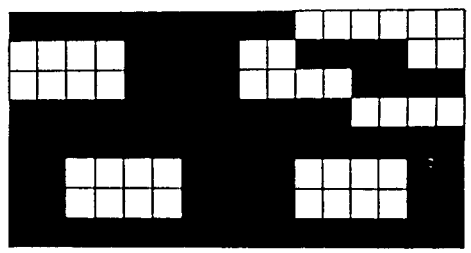
FIG. 4(h)
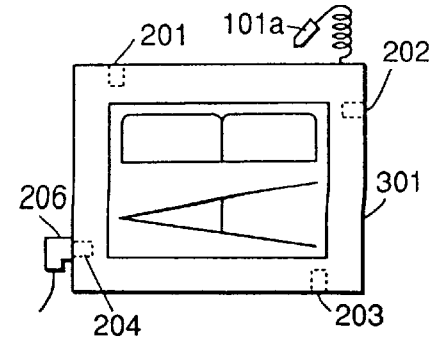

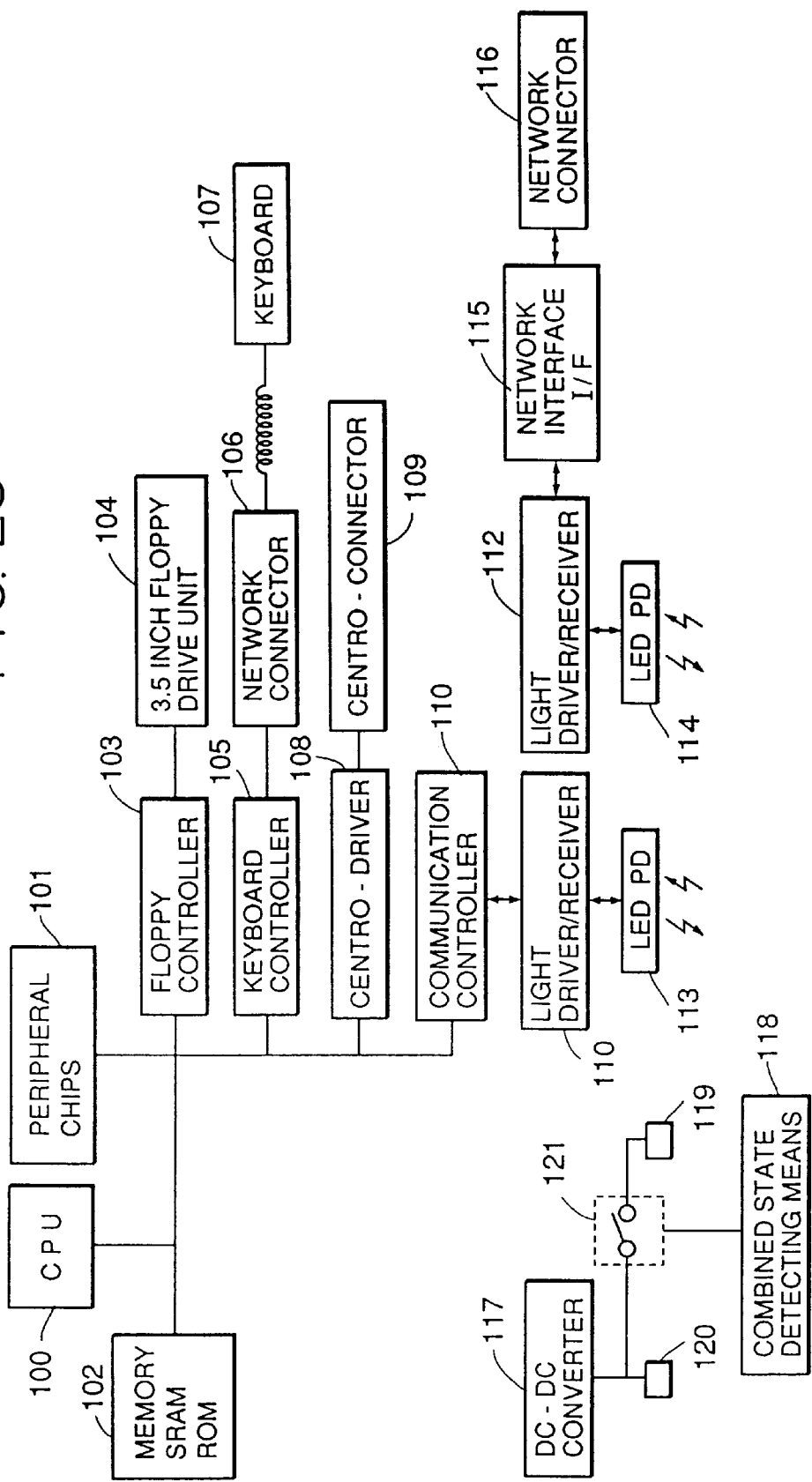

INFORMATION PROCESSOR

This application is a continuation of application Ser. No. 08/117,771, filed Sep. 8, 1993, now abandoned.

BACKGROUND OF THE INVENTION

1. Field of the Invention

This invention relates to an input-output integrated type information processor capable of controlling the orientation in which a picture is displayed on a display screen.

2. Description of the Related Art

FIG. 18 is a block diagram of the hardware construction of a conventional input-output integrated type information processor. Data is input through an input section 101 by a special pen 101a. A picture is displayed on an output section 102 in accordance with the content of a display random access memory (RAM) 105 by a display controller 104.

A central processing unit (CPU) 106 controls the overall operation of the processor. A RAM 107 and a ROM 108 are connected to the CPU 106. The orientation in which a picture is displayed on the display screen is fixed. This processor is not designed to have means for changing the picture display orientation.

SUMMARY OF THE INVENTION

An object of the present invention is to provide an electronic apparatus capable of changing the orientation of a displayed picture according to the orientation of the apparatus in a used state.

To achieve this object, according to one aspect of the invention, there is provided an electronic apparatus comprising input means for inputting information, display means including a display screen for displaying information, a casing for accommodating the input means and the display means, detection means for detecting orientation of the casing when the apparatus is used, and control means for changing the orientation of a picture displayed on the display screen on the basis of the detection made by the detection means.

According to another aspect of the invention, there is provided an electronic apparatus comprising input means for inputting information, display means including a display screen for displaying information, a casing for accommodating the input means and the display means, a base for receiving the casing, detection means for detecting the orientation of the casing relative to the base, and control means for changing the orientation of a picture displayed on the display screen on the basis of the detection made by the detection means.

According to still another aspect of the invention, there is provided an electronic apparatus comprising input means for inputting information, display means for displaying information, a casing for accommodating the input means and the display means, detection means for detecting the orientation of the casing when the apparatus is used, and control means for changing the orientation of a display content of the display means on the basis of the detection made by the detection means.

In accordance with another aspect of the present invention, an input-output type information processor includes input means for inputting information, display means including a display screen for displaying information, detection means for detecting the orientation of the apparatus in a used state and a control means for controlling the orientation in which a picture is displayed on the display screen of the apparatus are provided to enable the apparatus orientation in a used state to control the display orientation on the display screen without requiring a special operation by the user.

These and other objects, aspects, features and advantages of the present invention will become apparent from the following detailed description of the preferred embodiments taken in conjunction with the drawings.

BRIEF DESCRIPTION OF THE DRAWINGS

FIGS. 4(a) to 4(h) are diagrams of the relationship between the DC plug insertion direction and the display orientation;

FIG. 28 is a block diagram of the sub unit; and

DESCRIPTION OF THE PREFERRED EMBODIMENTS

Embodiments of the present invention will be described below with reference to the accompanying drawings.

Figure 1:
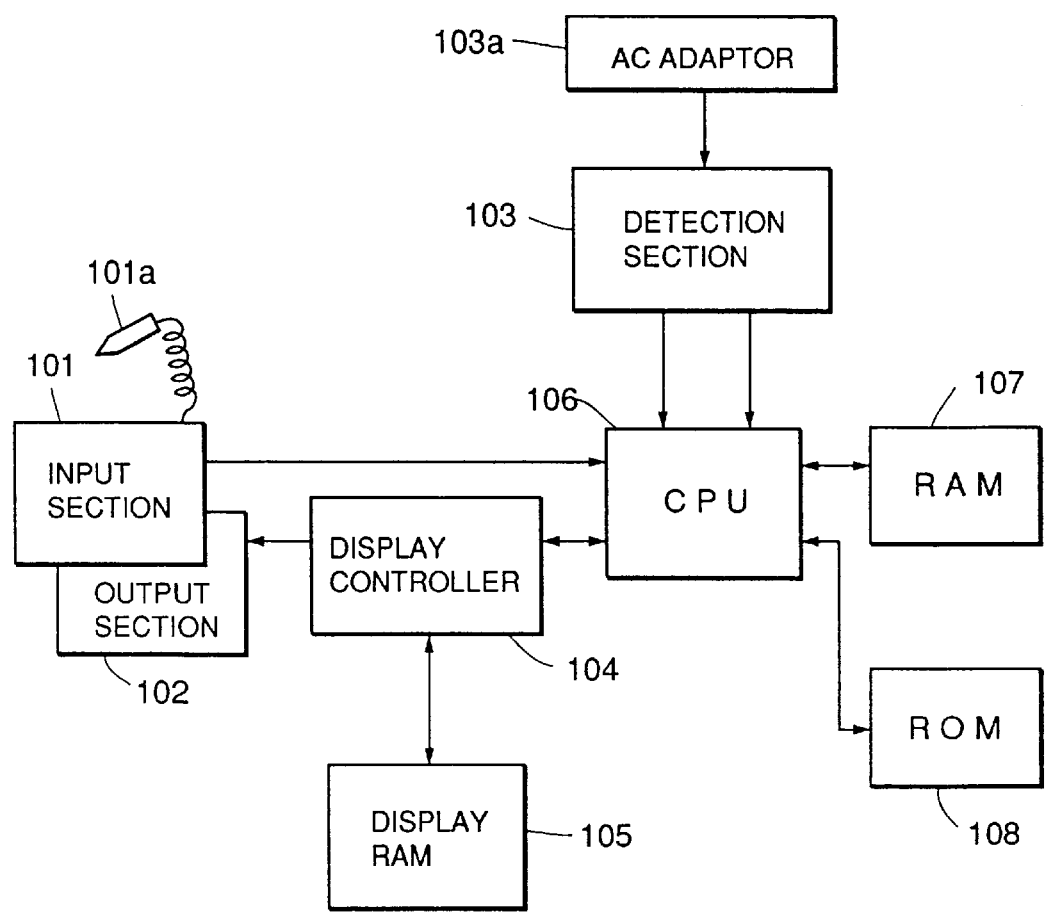
FIG. 1 is a block diagram of the hardware construction of a first embodiment of the present invention.

FIG. 1 shows blocks of the hardware construction of an embodiment of the present invention. Each of elements shown in block outline in FIG. 1 as well as in FIGS. 2, 5, 17, 18, 26 and 28, is well known per se, and a specific type of construction is not critical to carrying out the invention or to a disclosure of the best mode for carrying out the invention. Of course, the arrangement and interaction of these elements forms part of the subject invention. An input section 101 is, for example, a pressure sensitive type tablet. Data is input by writing on the tablet with a special pen 101a.

An output section 102 is a display device, e.g., a liquid crystal display. The input section 101 and the output section 102 form an input-output integrated unit.

A detection section 103 detects the orientation of the information processor in a used state and sends a result of the detection to a CPU 106. An AC adaptor 103a extends from the detection section 103.

A display controller 104 displays information or images on the output section 102 in accordance with the content of a display RAM 105. The display controller 104 rewrites the display RAM 105 by a command from the CPU 106.

The display RAM 105 stores data for displaying through the output section 102.

The CPU 106 controls the overall operation of the information processor in accordance with control procedures stored in the memories 107 and 108.

Figure 19:
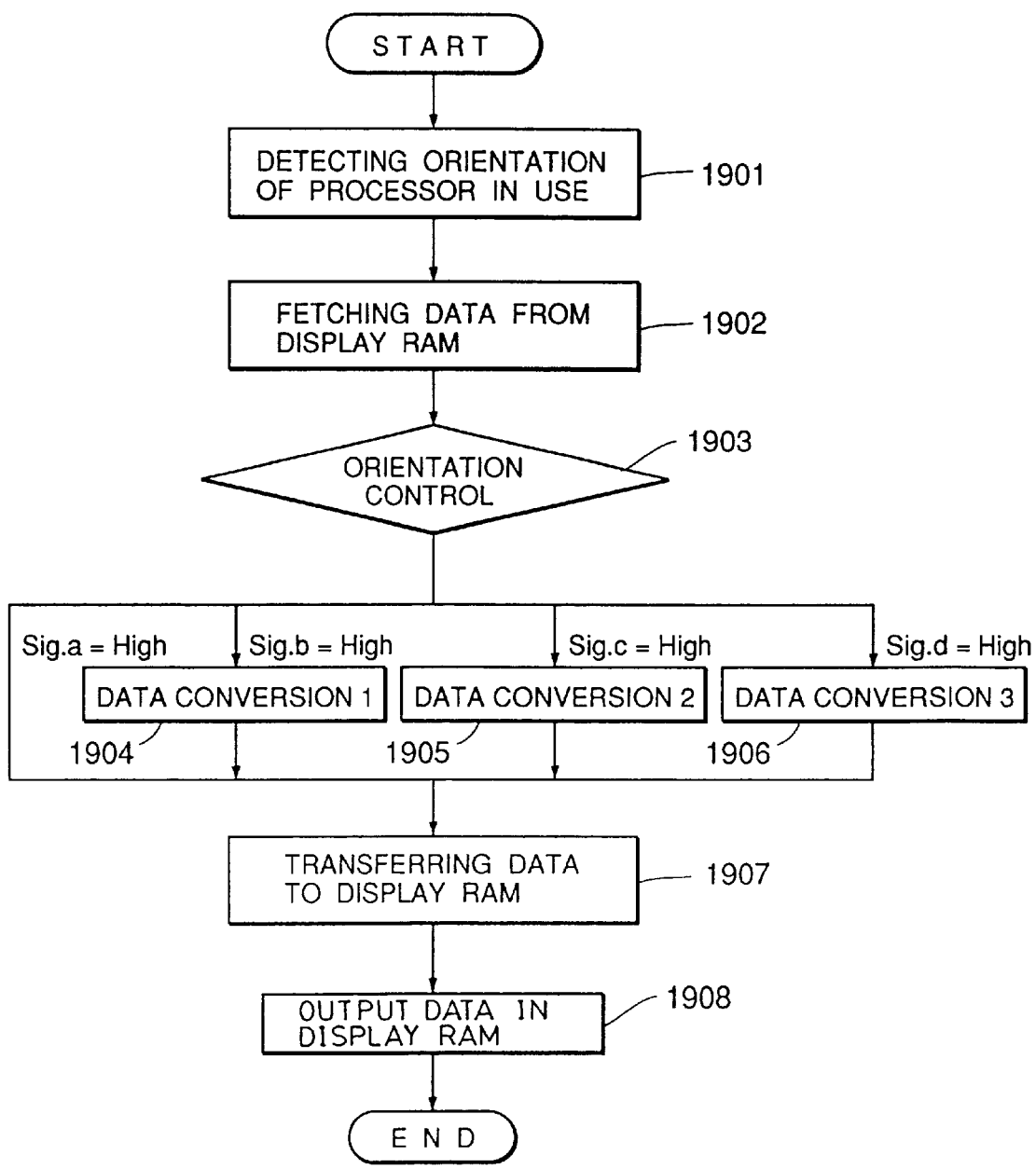
FIG. 19 is a flowchart of a control process.
Figure 22:
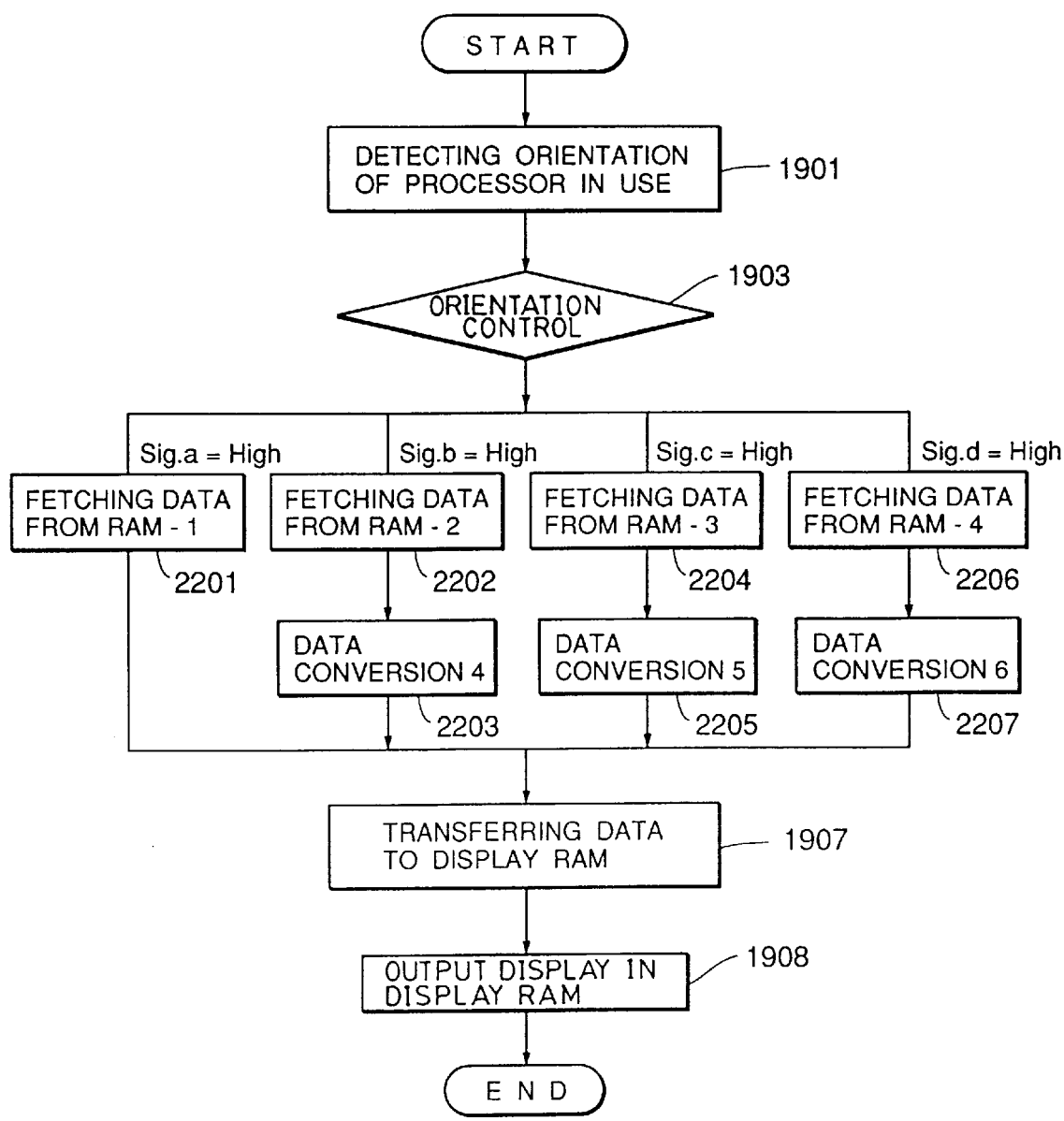
FIG. 22 is a flowchart of a control process.

The memory 107 is a RAM for storing display data and a control procedure, and the memory 108 is a control memory ROM in which a control procedure shown in FIG. 19 or 22, for example, is stored.

Figure 2:
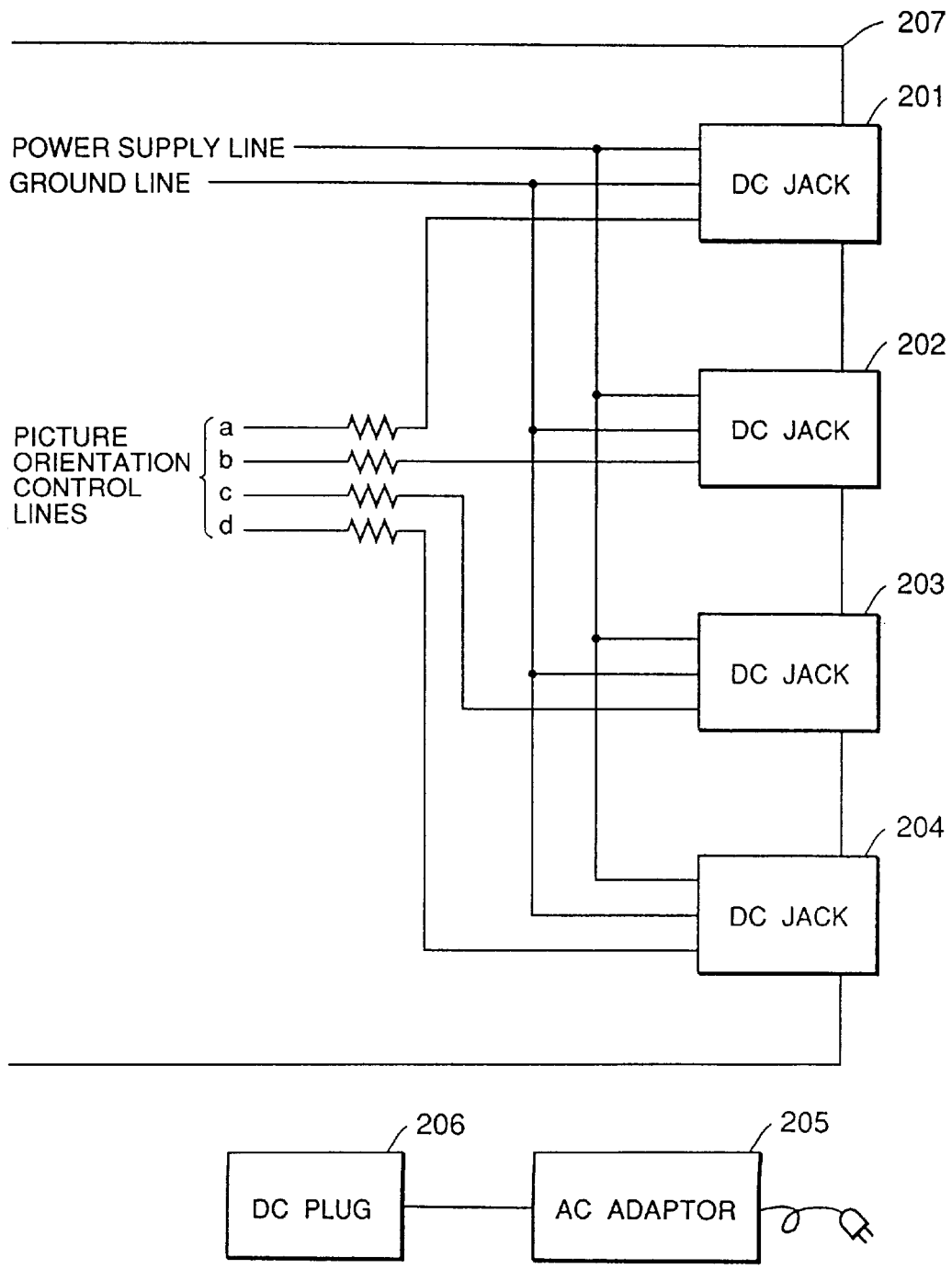
FIG. 2 is a circuit diagram of a detection section 103.

FIG. 2 is a detailed circuit diagram of the detection section 103. As shown in FIG. 2, there are four power supply channels having DC jacks 201 to 204, and a DC plug 206 is inserted into one of the DC jacks 201 to 204 to supply power. From each DC jack, a power supply line extends and a ground line and a picture orientation control signal line also extend.

An AC adaptor 205 is used to supply power from a home AC outlet and to convert AC power into DC power. DC power is supplied through the power supply line, the ground line and each picture orientation control signal line. A line 207 in FIG. 2 indicates a main body of the information processor.

Figure 3:
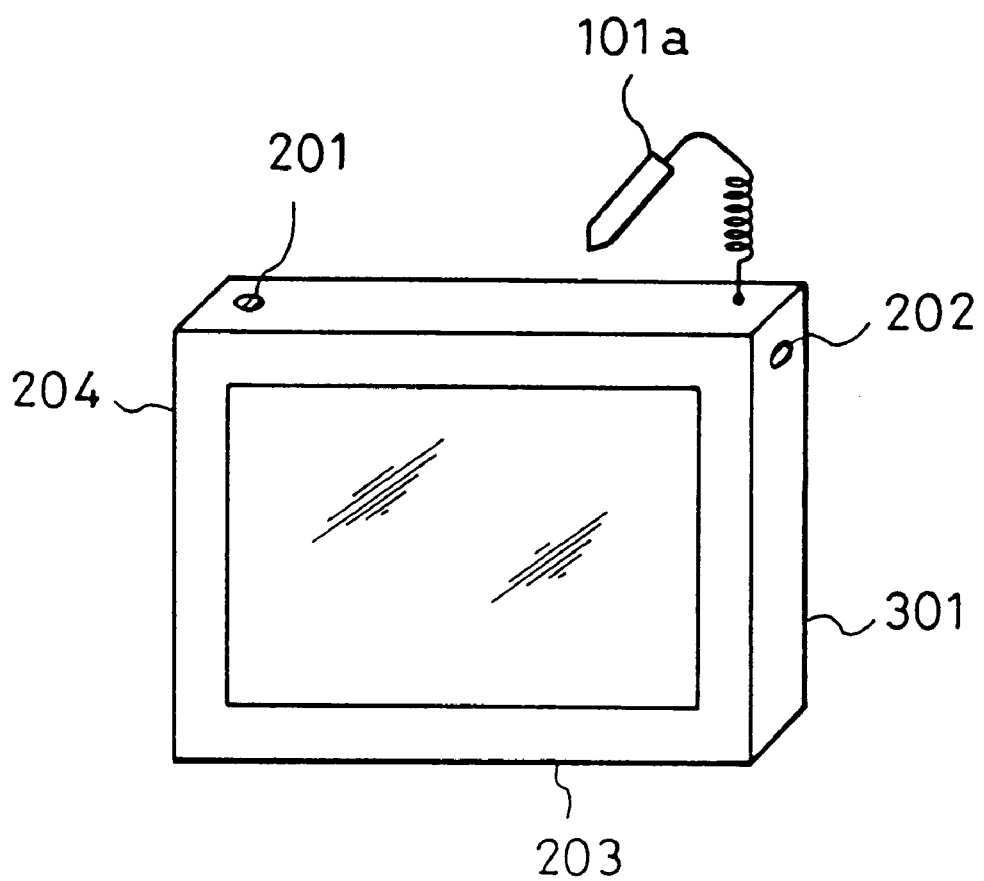
FIG. 3 is a diagram of an external appearance of a processor in accordance with the first embodiment.

FIG. 3 shows the outward appearance of the processor. The input pen 101a extends from a frame 301. The DC jacks 201 to 204 are provided in four side surfaces of the frame. (DC jacks 203 and 204 are not seen in FIG. 3.)

The operation of controlling the orientation in which a picture is displayed in accordance with this embodiment will be described below. Display contents displayed in a displayed picture are stored as bit map data in the display RAM 105. FIG. 4(a) shows an example of a display, and FIG. 4(b) shows the content of the display RAM 105 corresponding to this display example.

When the DC plug 206 is inserted into one of the DC jacks 201 to 204, electric power is supplied to the processor and one of picture orientation control signals a to d is sent to the CPU 106. The CPU 106 rewrites data in the display RAM 105 in accordance with a high level signal in picture orientation control signals a to d by a conversion formula shown below. However, CPU 106 does not convert data if the picture orientation control signal a is high.

(1) If the picture orientation control signal b is high, $$\text{bit}(x, y) = \text{old bit}(int\{a/by\}, int\{b/a(a-x)\}) \qquad (a)$$

(2) If the picture orientation control signal c is high, $$\text{bit}(x, y) = \text{old bit}(int\{a-x\}, int\{b/a(b-y)\}) \qquad (b)$$

(3) If the picture orientation control signal d is high, $$\text{bit}(x, y) = \text{old bit}(int\{a/b(b-y)\}, int\{b/ax\}) \qquad (c)$$

In these equations, a and b represent picture sizes, bit (x, y) represents data of (x−int{x/8×8}) at address (a/8y+int{x/8}) in the display RAM 105. Also, int{a/by} represents an integer part of the value of a/by.

FIG. 4(c) shows the state of the display RAM 105 after rewriting of the content thereof shown in FIG. 4(b).

The display controller 104 displays converted data in the display RAM 105 through the output section 102 to change the orientation in which a picture is displayed. FIG. 4(d) shows a picture displayed in accordance with the content of the display RAM 105 shown in FIG. 4(c). FIGS. 4(g) and g(h) schematically show pictures in a case where the orientation in which the picture is displayed as shown in FIG. 4(a) is converted. FIGS. 4(e) and 4(e and 4(f) are schematic diagrams corresponding to FIGS. 4(a) and 4(c). As is apparent from FIGS. 4(e) to 4(h), an operator using the processor can select an optimal picture display orientation in any situation by inserting the DC plug 206 into the DC jack at a position such that the AC adaptor 205 does not interfere with an input operation, i.e., the DC jack at the top of the processor as viewed by the operator.

Figure 17:
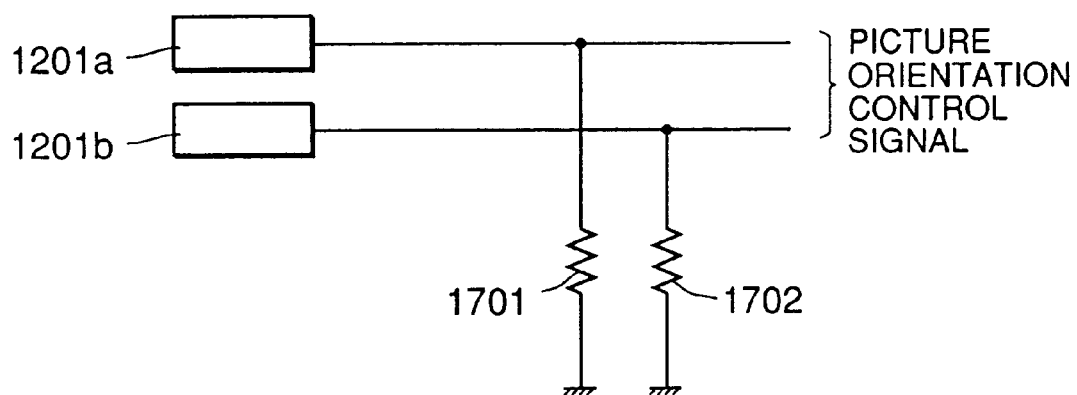
FIG. 17 is a circuit diagram of a detection section in accordance with the third embodiment.
Figure 18:
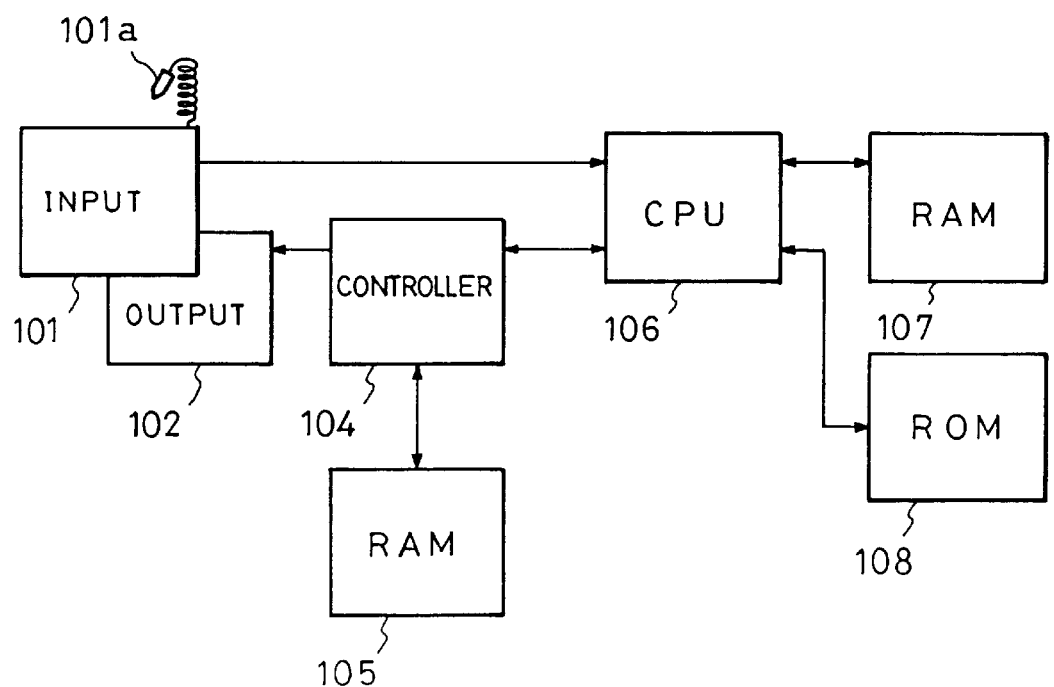
FIG. 18 is a block diagram of the hardware construction of a conventional input-output integrated type information processor.

FIG. 17 shows an example of a detection circuit of a third embodiment for detecting the orientation in which the processor is used. The circuit has pull-down resistors 1701 and 1702.

If the main unit is combined with a sub unit in a position such that a longitudinal axis of the main unit extends perpendicularly to a direction in which the operator faces the main unit (hereinafter referred to as "widthwise position") or in another position such that the longitudinal axis extends parallel to this direction (hereinafter referred to as "longitudinal position"), one of two electrodes 1201a and 1201b is electrically connected. The operation of controlling the orientation in which a picture is displayed by using picture orientation control signals is performed in the same manner as in the first and second embodiments.

The main unit and the sub unit are separately formed in accordance with the third embodiment. In such a case, when the main unit is used by being combined with the sub unit, a user can select the picture display orientation without being conscious of the selection.

Needless to say, the same effect can also be attained in a case where the user uses the main unit while the main unit is separated from the sub unit, if the first or second embodiment is practiced by being combined with the third embodiment.

FIG. 19 shows a flowchart of a picture display orientation changing process executed by the CPU as described above. In step 1901, the orientation of the processor in a used state is detected according to one of picture orientation control signals a to d set to high level. In step 1902, data in the display RAM 105 is transferred to the CPU 106. In step 1903, the data conversion method corresponding to the orientation of the processor in use detected in step 1901 is selected. If signal b is high, the data is converted in accordance with the equation (a) in step 1904. If signal c is high, the data is converted in accordance with the equation (b) in step 1905. If signal d is high, the data is converted in accordance with the equation (c) in step 1906. If signal a is high, the data is not converted. Next, in step 1907, the converted data is transferred to the display RAM 105 and, in step 1908, the display controller 104 outputs the data in the display RAM 105, thereby changing the orientation in which the picture is displayed.

In the above-described embodiment, a signal indicating the state of connection between a plurality of DC jacks and a plurality of DC plugs is used as means for detecting the orientation of the processor in a used state. Alternatively, an orientation detection means using an input pen may be formed.

Figure 5:
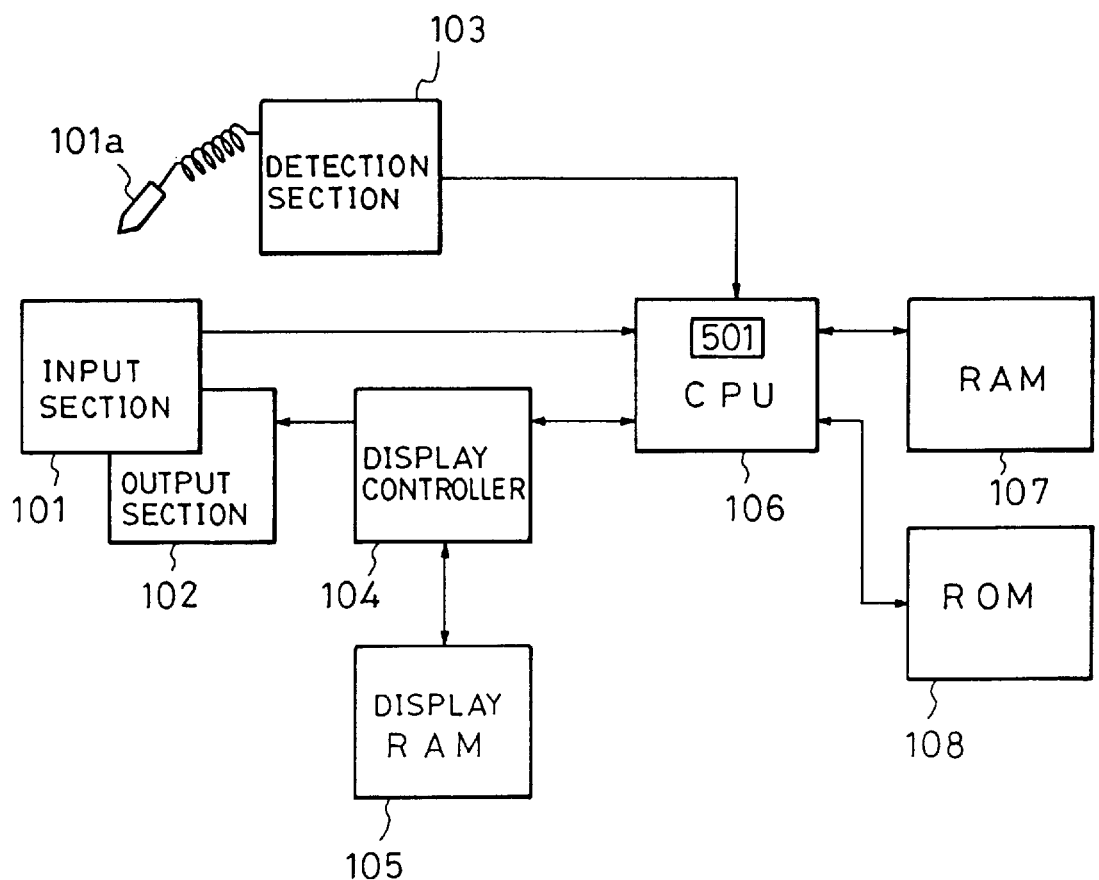
FIG. 5 is a block diagram of the hardware construction of a second embodiment of the present invention.

FIG. 5 shows blocks of the hardware construction of an embodiment of the present invention. A block 501 represents a detection section for detecting the orientation of a processor in a used state.

Figure 6:
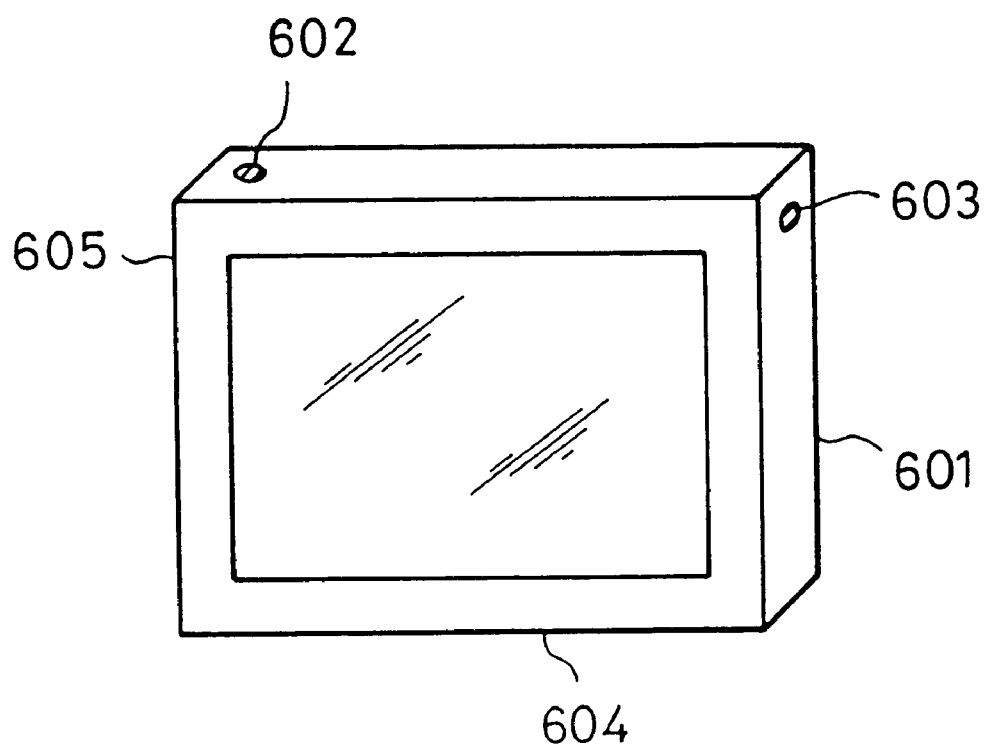
FIG. 6 is a diagram of an external appearance of a processor in accordance with the second embodiment.

FIG. 6 shows the outward appearance of the processor in accordance with this embodiment. The processor has a frame 601 having four side surfaces. Connectors 602 to 605 in which a cord of an input pen 101a is inserted are respectively mounted in the side surfaces of the frame 601. (Connectors 604 and 605 are not illustrated in FIG. 6.) Each of the connectors 602 to 605 forms a depressed type switch which is depressed when the cord of the pen 101a is inserted.

Figure 7:
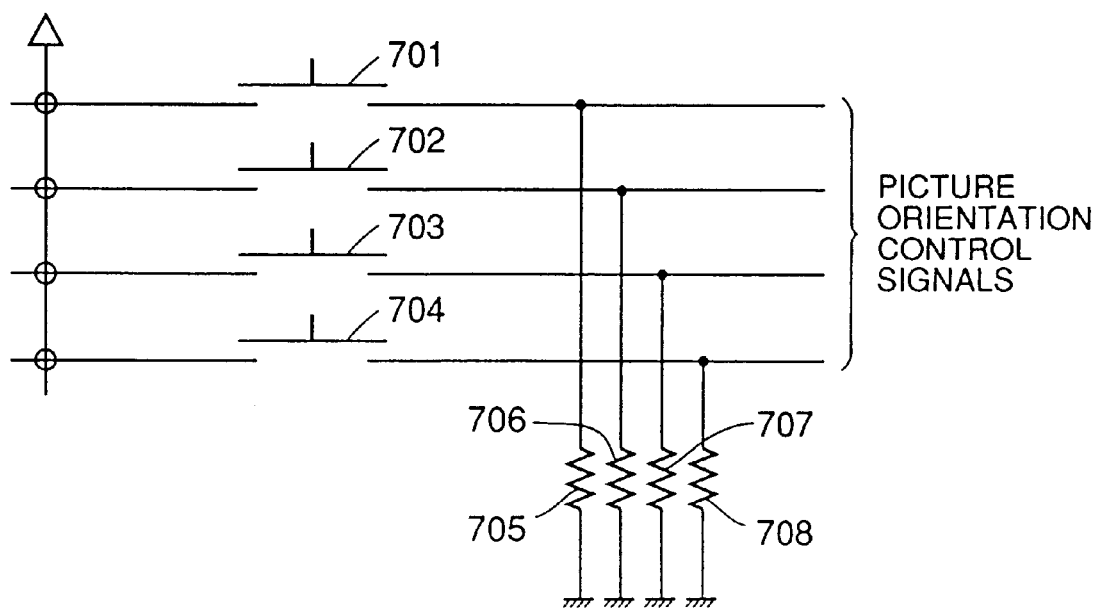
FIG. 7 is a circuit diagram of a detection section 501.

FIG. 7 is a circuit diagram of an example of the detection section 501. Depressed switches 701 to 704 are arranged in correspondence with the connectors 602 to 605 along with pull-down resistors 705 to 708.

Figure 20:
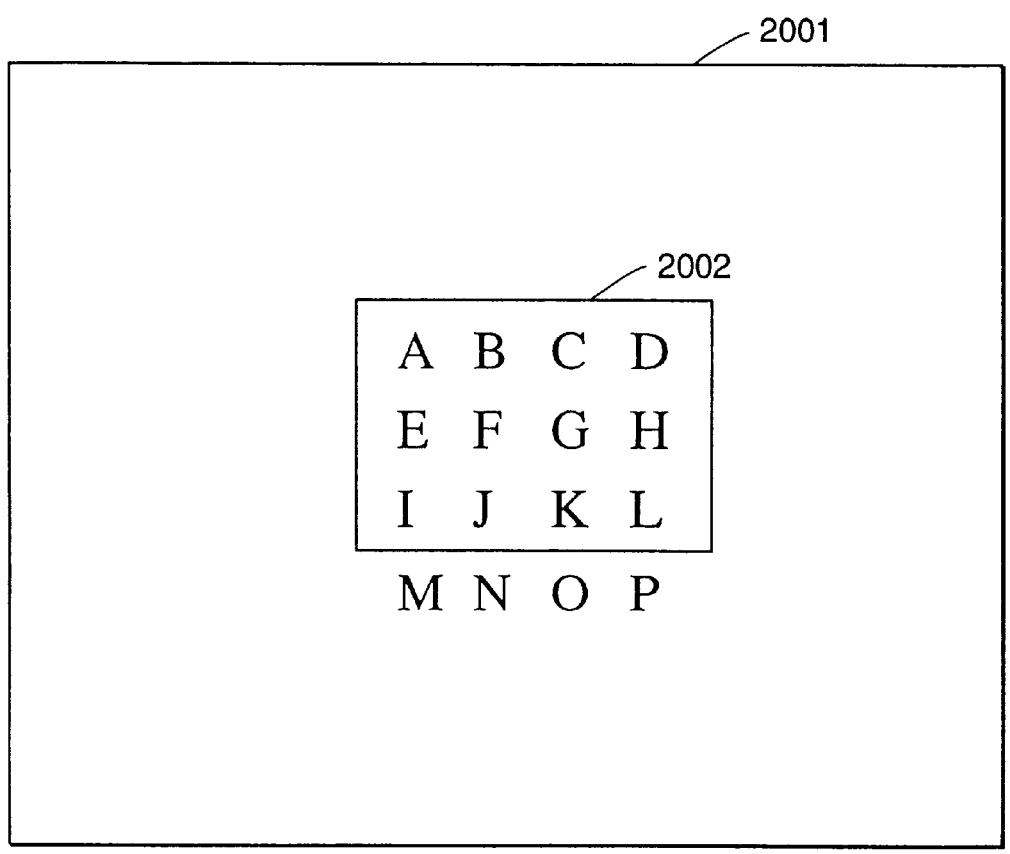
FIG. 20 is a diagram of a display screen.

If the pen 101a is inserted into one of the connectors 602 to 605, the corresponding one of the depressed switches 701 to 704 is depressed and the corresponding one of picture orientation controls signals a to d is sent to the CPU 106. The CPU 106 determines the display orientation from the received picture orientation control signal and converts data in the display RAM 105. In the above-described embodiment, data conversion is effected by changing the ratio of the longitudinal and widthwise sizes. In this embodiment, however, data conversion may be effected by changing display areas. FIG. 20 shows the relationship between a whole picture area 2001 and a display area 1002. The CPU 106 displays a picture by transferring data of the display area 2002 to the display RAM 105 through the display controller 104. That is, the displayed picture is changed by changing the display area or the order of transfer of data in the display area.

Figure 21A:
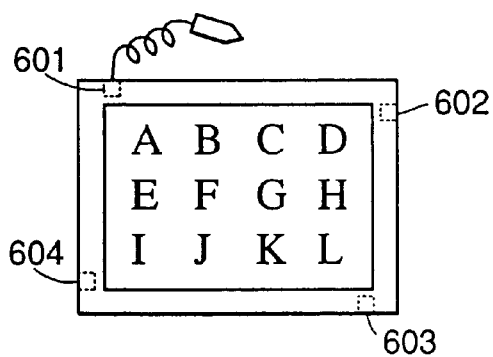
FIGS. 21(a) to 21(d) are diagrams of picture rotation.
Figure 21B:
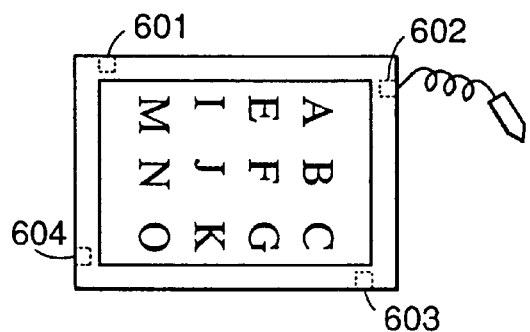
Figure 21C:
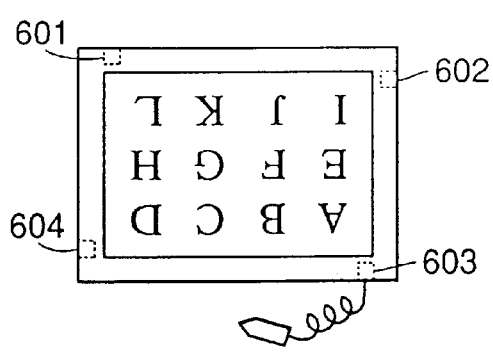
Figure 21D:
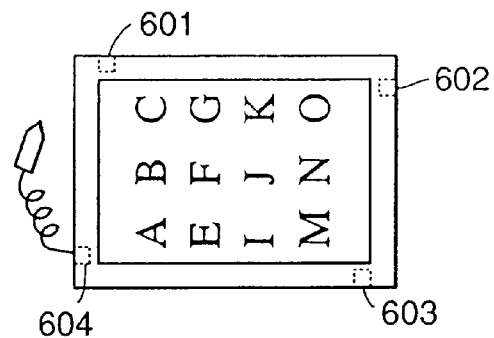

FIG. 22 shows a flowchart of another picture display orientation changing process in accordance with this embodiment. In step 2201, a display area is selected from the whole picture area shown in FIG. 20 to display a picture such as that shown in FIG. 21(a), and corresponding data is transferred to the CPU 106. In steps 2202 and 2203, a display area is selected to display a picture such as that shown in FIG. 21(b), and corresponding data is transferred to the CPU 106 to be converted. Similarly, in steps 2204 and 2205, and in steps 2206 and 2207, display areas are selected to display pictures such as those shown in FIG. 21(c) and 21(d), respectively.

In the above-described embodiment, the means for detecting the orientation of the processor in a used state cannot be used when a battery or the like is used as a power source for the processor, since the detection means is based on the detection of the state of connection between DC jacks and DC plugs. In contrast, the processor of this embodiment is advantageous in that it is possible to detect the orientation of the processor in a used state and to control the picture display orientation even in use in which much importance is attached to the portability or a feature of the input-output integrated type, that is, when a home power supply is not used.

In the above-described first and second embodiments, the orientation of an input-output integrated type information processor is detected from the state of connection between the information processor and a cord. However, the orientation of this type of processor may be detected from the state of connection between a main unit and a sub of the processor by arranging the units in such a manner that the main unit is formed of a digitizer, a liquid crystal display, a CPU, a battery, backup memory, a hard disk and other components, while the sub unit is formed of a floppy disk drive, an I/O port such as an RS232, a network interface and other components, and that the main unit and the sub unit can be attached and detached (combined and separated) in a plurality of directions.

The construction of the main unit of a processor arranged in this manner will be described below.

Figure 8:
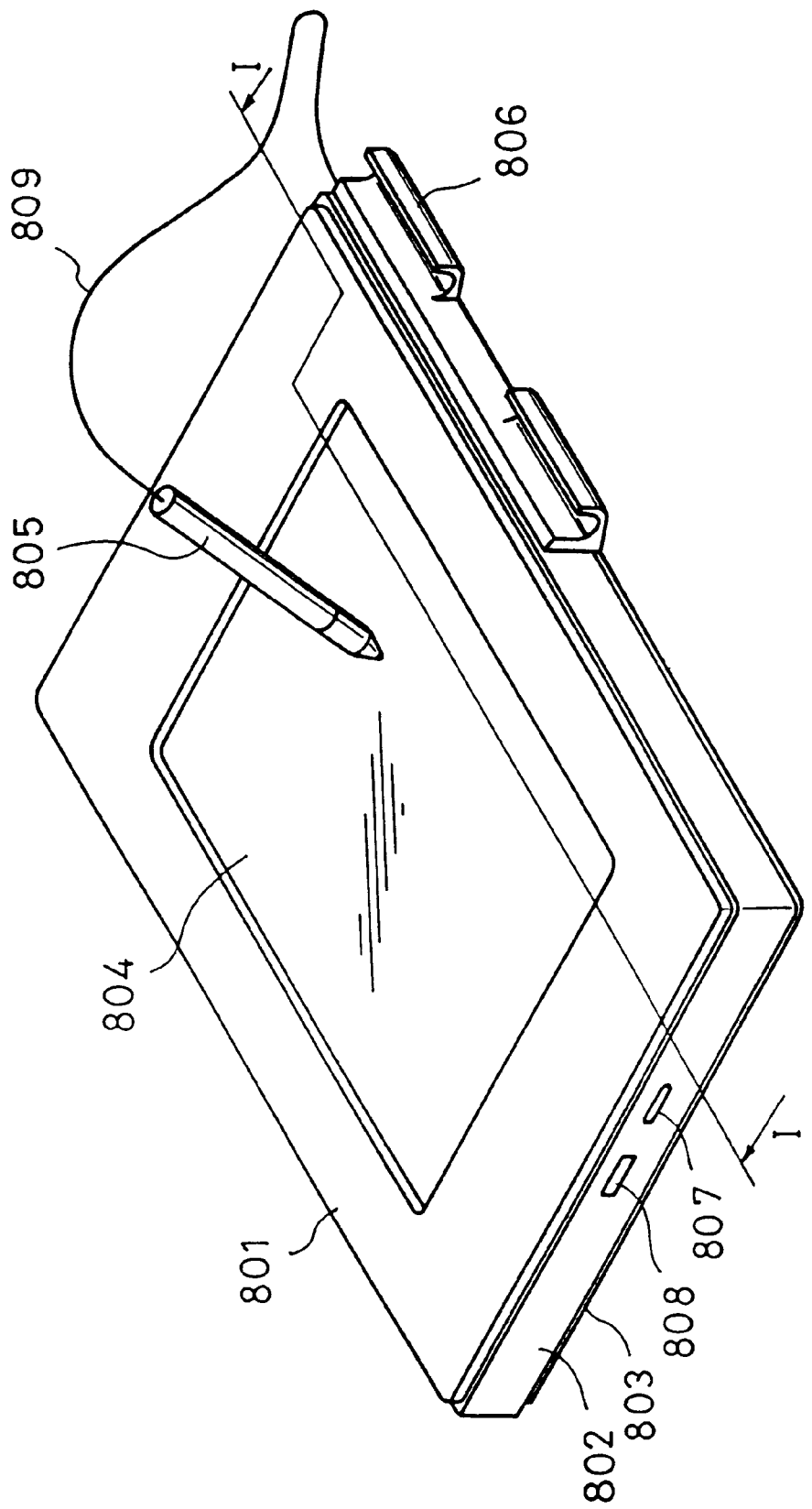
FIG. 8 is a diagram of an external appearance of a main unit of a processor in accordance with a third embodiment.

FIG. 8 is a perspective view of an appearance of the main unit. The main unit has a casing having a generally rectangular external configuration. The casing is formed of an upper casing member 801, a middle casing member 802 and a lower casing member 803 each made of a resin. A generally rectangular opening is formed in a central portion of the upper casing member 801, and a digitizer 804 having an input surface is provided at the opening. A liquid crystal display (LCD) is provided under the digitizer 804. A holder 806 for an input pen 805 described later, a main switch 807, a knob 808 for adjusting the contrast of the LCD, an illustrated IC card connector and DC jack are provided on side portions of the middle casing member 802. Also, guide portions 1601a to 1601d in the form of elongated holes or recesses (FIG. 16) forming part of a means for combining the main and sub units are provided in two places in a side surface portion of the middle casing member 802 corresponding to the remote-most side as shown in FIG. 8 and in two places in an adjacent left side surface portion. A connector for connecting the input pen 805 is provided in the vicinity of the center of a right side surface portion. In this embodiment, this connector is covered with the holder 806 and cannot be seen in the external appearance. The input pen 805 and this connector are connected by a cord 809, which can be wound in a gap between a main unit side surface portion and the holder 806.

Figure 9:
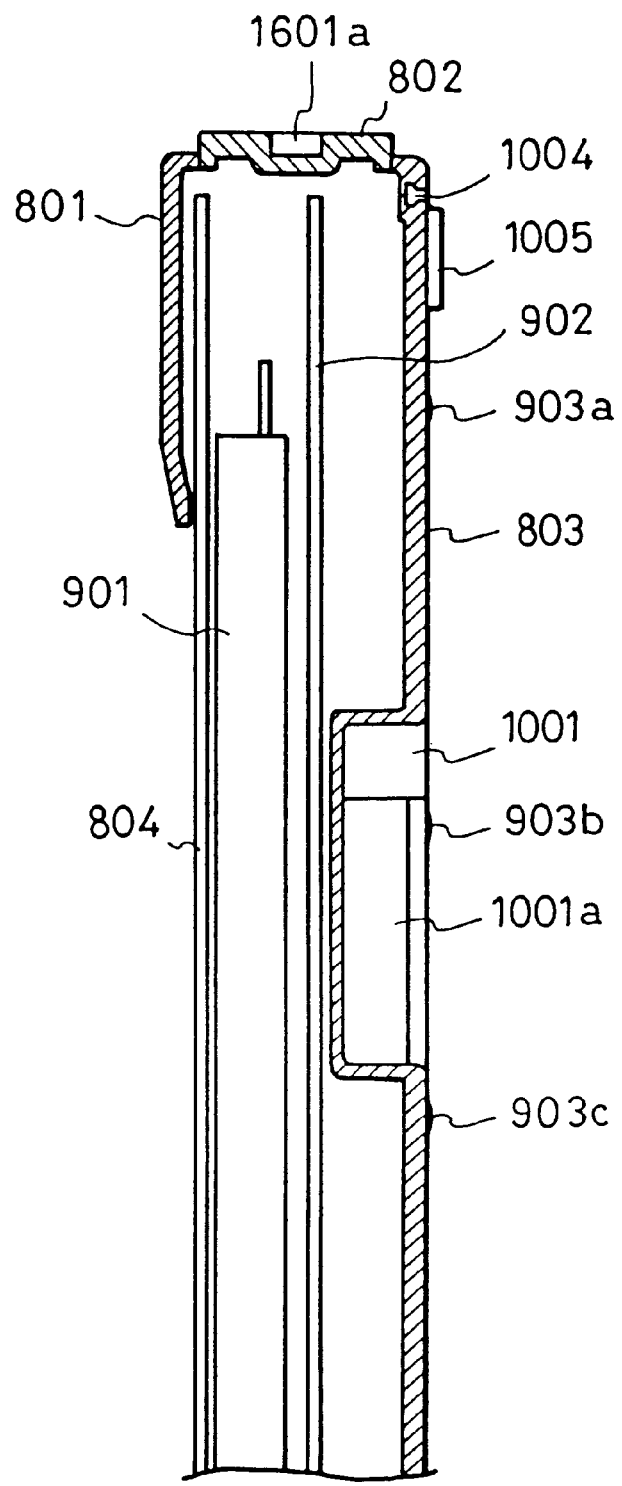
FIG. 9 is a schematic cross-sectional view of the main unit.
Figure 10:
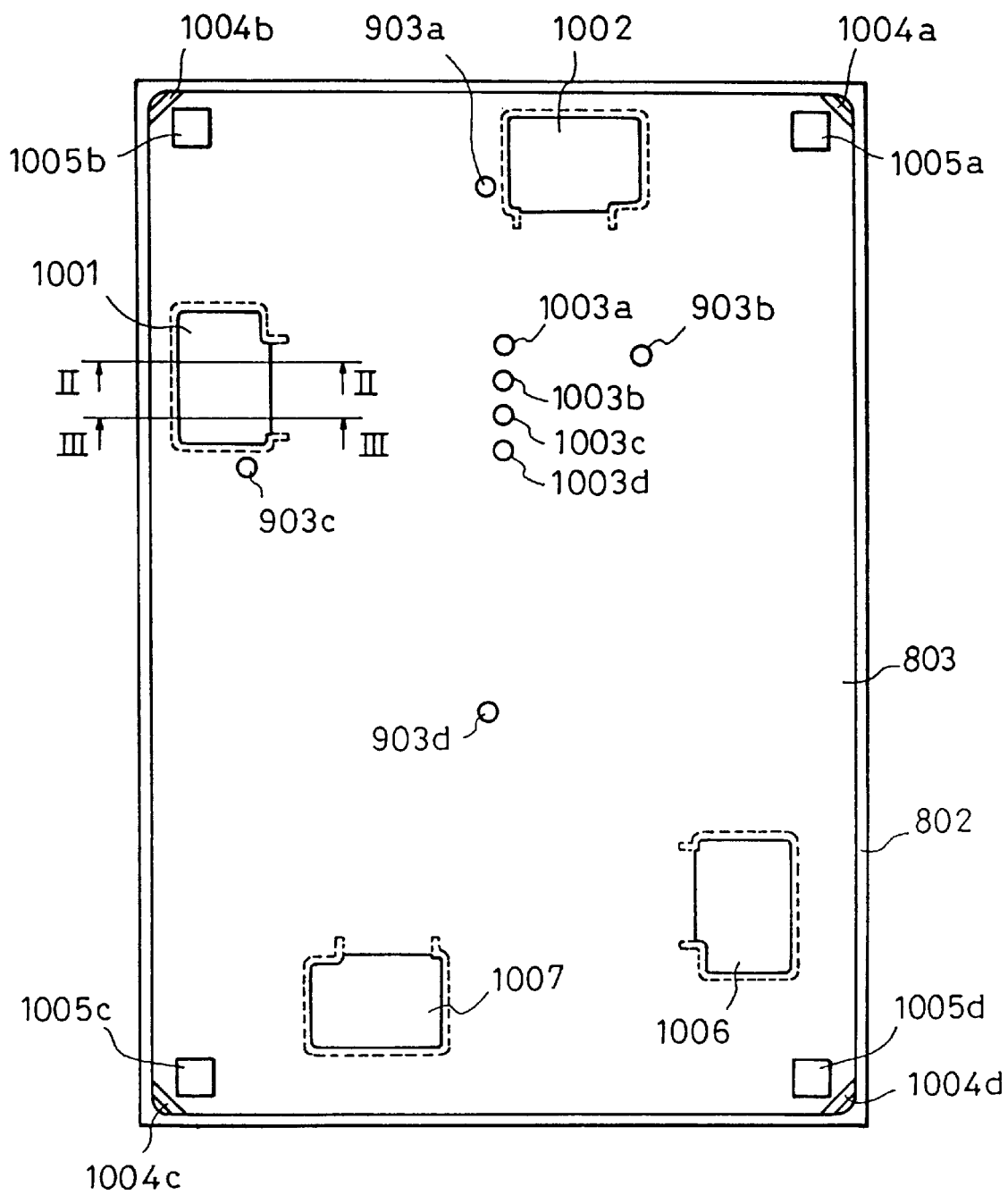
FIG. 10 is a bottom view of the main unit.

FIG. 9 is a schematic cross-sectional view (along the line I—I) of the main unit. FIG. 10 is a bottom view of the main unit. An LCD 901 and the digitizer 804 are fixed in a superposed state in the middle casing member 802. A printed circuit board 902 on which a CPU, memories, an LCD controller, a digitizer controller, a power supply circuit and other components are mounted is fixed below the LCD 901. The upper, middle and lower casing members 801, 802, and 803 are fixed to each other by screws or elastic hooks (snap-action fixing means). Further, two recesses 1001 and 1002 and a plurality of hemispherical projections 903a to 903d forming a part of the combining means are provided on a bottom surface of the main unit formed by the lower casing member 803. Also, a plurality of optical communication windows 1003a to 1003d arranged along the longitudinal axis, channels 1004a to 1004d for receiving the cord 809 pressed thereinto are formed in the bottom surface. The height of the projections 903a to 903d is smaller than that of rubber feet 1005a to 1005d.

Figure 11:
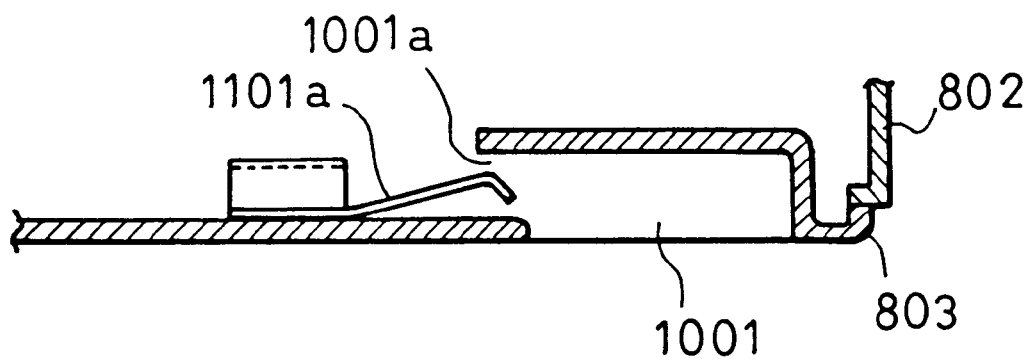
FIG. 11 is a first schematic cross-sectional view of a recess 1001 of the main unit.
Figure 12:
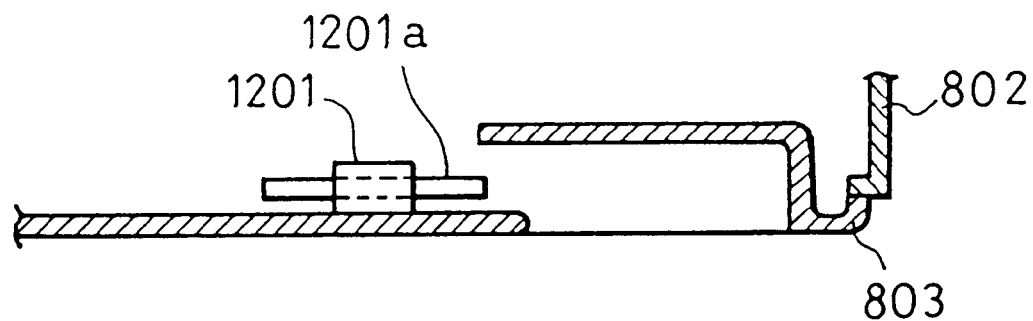
FIG. 12 is a second schematic cross-sectional view of the recess 1001 of the main unit.

FIG. 11 is a first schematic cross-sectional view (along the line II—II) of the recess 1001 of the main unit. An opening 1001a or 1002a is formed in a portion of one of four side surfaces forming each of the two recesses 1001 and 1002, and a plate spring 1101a or 1101b is provided in the opening 1001a or 1002a. FIG. 12 is a second schematic cross-sectional view (along the line III—III) of the recess 1001. Electrodes formed of two electrode pins 1201a and 1202b are provided in the opening 1001a. The recess 1002 is formed in such a manner that the recess 1001 is rotated clockwise by 90°.

The construction of the sub unit will be described below.

Figure 13:
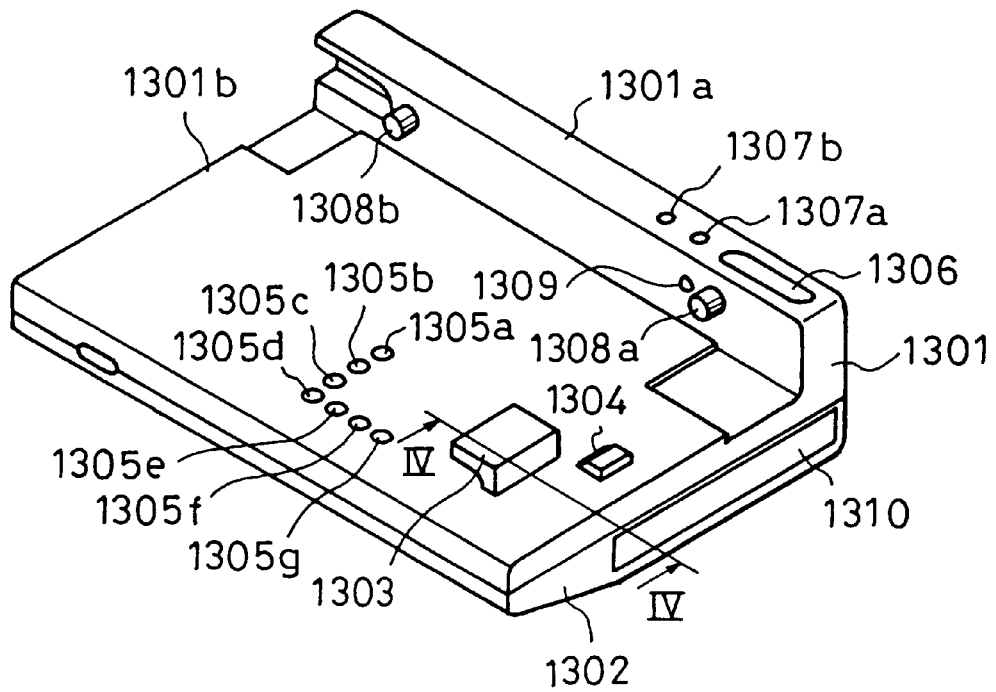
FIG. 13 is a diagram of an external appearance of a sub unit.

FIG. 13 is a perspective view of the outward appearance of the sub unit. The sub unit has a casing having an external configuration generally L-shaped as viewed from the left or right side. The casing is formed of an upper casing member 1301 and a lower casing member 1302 each made of a resin in such a manner that an elongated generally rectangular projecting portion 1301a is formed on an upper surface of a generally rectangular box at one side of the same. The width of the sub unit is approximately equal to the width of the main unit in the direction perpendicular to the longitudinal axis. A hook portion 1303 and an engagement knob 1304 forming part of a combining means are provided on an upper surface 1301b of the upper casing member 1301 (apart from an upper surface of the projection 1301a). A plurality of windows 1305a to 1305g for an optical communication unit are also formed in the upper surface 1301b in two rows extending along the pairs of opposite sides of the casing and intersecting perpendicularly with each other. The engagement knob 1304 is urged upward by an unillustrated spring and can move until its upper surface becomes approximately flush with the upper surface 1301b when a predetermined force is applied to the engagement knob 1304. On the upper surface of the projecting portion 1301a, a release button 1306 forming part of a means for separating the main and the sub units, and a plurality of light emitting diodes (LED) 1307a and 1307b for indicating the states of a power supply and a floppy disk drive or the like are provided. When the release button 1306 is manually depressed, the engagement knob 1304 is moved downward by an unillustrated incorporated rotary/slide mechanism. Guide pins 1308a and 1308b are provided at left and right positions on an inner surface of the projecting portion 1301a. An operating pin 1309 for operating a combined state detection switch described later is provided in the vicinity of one of the pair of guide pins 1308a. A port of a floppy disk drive 1310 is formed in one of the L-shaped side surface of the sub unit, while an unillustrated I/O port, a network interface, a keyboard connector and a DC jack or the like are provided at the other L-shaped side surface.

Figure 14:
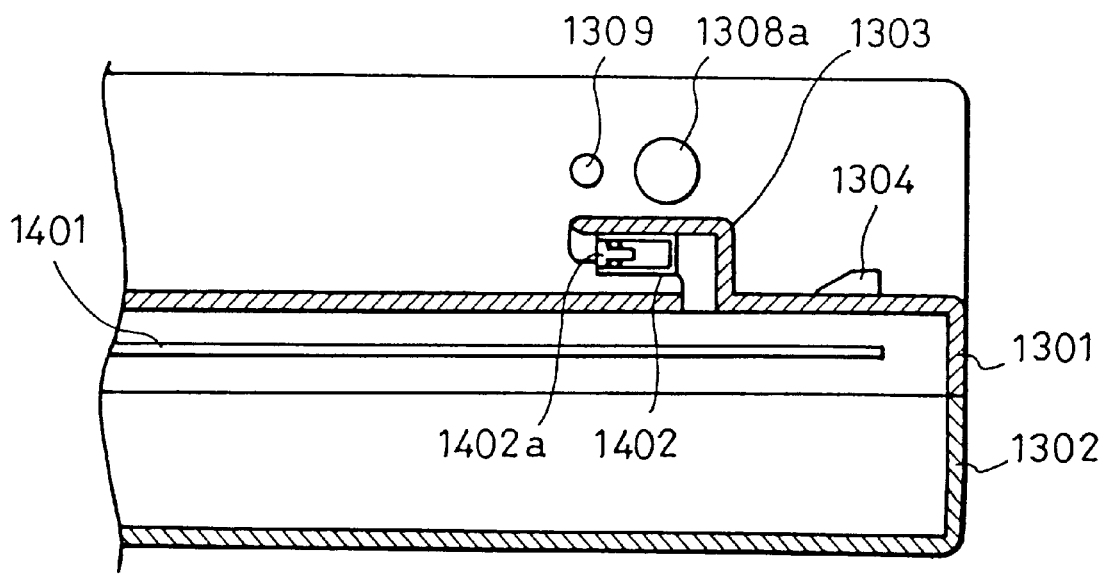
FIG. 14 is a schematic cross-sectional view of a hook portion 1303 of the sub unit.

FIG. 14 is a schematic cross-sectional view (along the line IV—IV)of the hook portion 1303 of the sub unit. A printed circuit board 1401 on which a CPU, a memory, optical communication means and other components are mounted is fixed in the upper casing member 1301. Electrodes having a pair of electrode pins 1402a and 1402b urged in an axial direction by a spring are disposed inside the hook portion 1303.

Means for combining and separating the main and sub units will be described below in detail. The combining operation and the combining means will first be described.

Figure 15A:
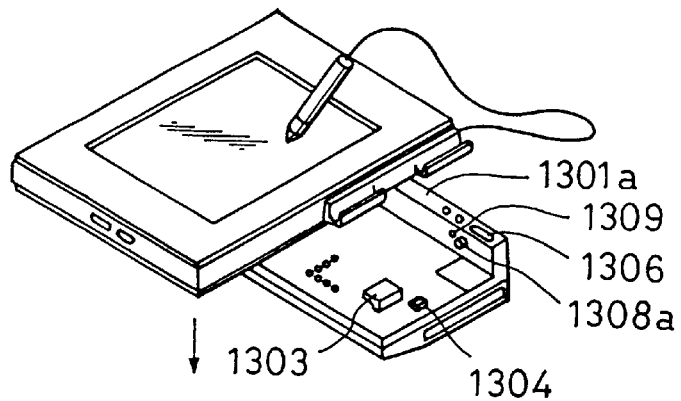
FIGS. 15(a) to 15(d) are diagrams of an example of an operation of combining/separating the main and sub units.
Figure 15B:
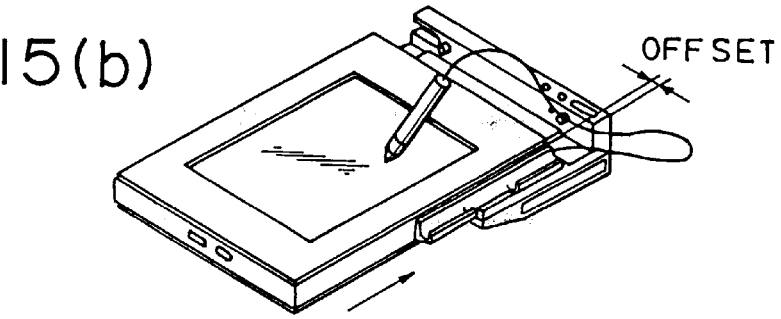
Figure 15C:
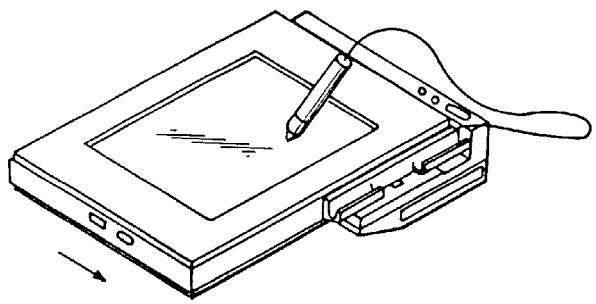
Figure 15D:
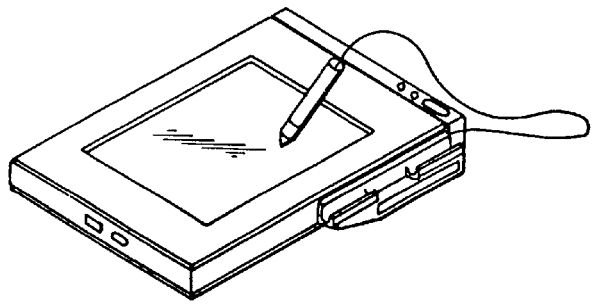

FIGS. 15(a) to 15(d) are external appearance perspective views for explaining the combining and separating operations in a case where the main unit is used in the longitudinal position. The positional relationship between the main and sub units and the state of the same when the operation of combining the main and sub units is completed as shown in FIG. 15(d) will be described first. When the main and sub units are combined completely, the sub unit is positioned under the main unit and at a position remote from the operator. Main portions of the side surfaces of the main and sub units facing in the widthwise direction are generally flush with each other. A predetermined gap is formed between the side surface of the main unit remote from the operator and the inner side surface of the projecting portion 1301a of the sub unit. At this time, the guide pins 1308a and 1308b of the sub unit are respectively inserted in the two guide portions 1601a and 1601b in the side surface of the main unit remote from the operator. Also, the hook portion 1303 of the sub unit is positioned in one of the recesses in the bottom surface of the main unit, i.e., the recess 1001, and a part of the hook portion 1301 is inserted in the opening 1001a. Also, some of the projections 903a to 903d on the bottom surface of the main unit contact the upper surface 1301b of the upper casing member 1301. In this state, the main and sub units are combined with each other with, if any, a very small play in the vertical direction (the direction of thickness). Also, in the combined state of the main and sub units, only a very small play can occur between the main and sub units in a direction parallel to the direction in which the operator faces the main unit (the longitudinal direction of the main unit) because of the cooperation of bottom surfaces of the guide portions 1601a and 1601b and extreme ends of the guide pins 1308a and 1308b and by the cooperation of an inner side surface of the recess 1001 in the vicinity of the opening 1001a and a side surface of the hook portion 1303 on the projecting portion 1301a side. Further, a surface (not shown) in the opening 1001a in the recess 1001 of the bottom surface of the main unit abuts against an extreme end of the hook portion 1303, and one of rounded side surfaces of the guide portion 1601a and a side surface of the guide pin 1308a abut against each other. Also, the engagement knob 1304 of the sub unit is positioned in the recess 1001 in the bottom surface of the main unit with a predetermined gap formed between a right side surface of the engagement knob 1304 and a right side surface of the recess 1001. Therefore, only a very small play can occur between the main and sub unit in the direction perpendicular to the longitudinal axis of the main unit. Further, in the combined state, the operating pin 1309 of the sub unit is pressed into the body of the unit by the side surface of the main unit remote from the operator to operate the combined state detection switch. Also, the positions of the optical communication windows 1003a to 1003d and 1305a to 1305d of the main and sub units forming rows in the direction along the longitudinal axis coincide generally with each other. Further, the electrodes 1201a and 1201b on the main unit and the electrodes 1402a and 1402b on the sub unit are electrically connected by being brought into contact with each other at a predetermined spring pressure.

The combining operation will now be described. First, the main unit is placed on the upper surface 1301b of the sub unit as shown in FIG. 15(a). At this time, the main and sub units are set in a positional relationship such as to be shifted from each other in the direction perpendicular to the longitudinal axis of the main unit, that is, the right side surface of the sub unit is positioned at a predetermined distance to the right from the right side surface of the main unit. Also, the side surface of the main body remote from the operator and the inner side surface of the projecting portion 1301a of the sub unit are at a predetermined distance from each other. Naturally, the guide pins 1308a and 1308b are not in the state of being inserted in the guide portions 1601a and 1601b. At this time, the hook portion 1303 of the sub unit is positioned in the recess 1001 in the bottom surface of the main unit. Then, the main and sub units are relatively moved until the side surface of the main unit remote from the operator and the inner side surface of the projecting portion 1301 of the sub unit are brought into contact with each other. Simultaneously, the guide pins 1308a and 1308b are inserted into the guide portions 1601a and 1601b. Also, the operating pin 1309 is positioned at the guide portion 1601a and in a free state such that the combined state detection switch is not operated. Next, the main and sub units are relatively moved to the left and right. By this movement, the unillustrated surface in the opening 1001a in the recess 1001 of the bottom surface of the main unit and the extreme end of the hook portion 1303 of the sub unit are brought into contact with each other, and one of the rounded side surfaces of the guide portion 1601a are also brought into contact with each other, thereby positioning the main and sub unit in the direction perpendicular to the longitudinal axis of the main unit. By this operation, the hook portion 1303 is also inserted into the opening 1001a of the recess 1001. Further, by this operation, the engagement knob is temporarily moved downward by the bottom surface of the main unit and becomes free at a position in the recess 1001 to move upward by the urging force.

Next, the separating operation will be described. The engagement knob 1304 is moved downward by depressing the release button 1306 on the projecting portion 1301a of the sub unit. In this state, the main and sub units are relatively moved to the left and right, i.e., in directions opposite to the directions at the time of combining. Thereafter, the main and sub units are moved along the longitudinal direction of the main unit so that the guide pins 1308a and 1308b are disengaged from the guide portions 1601a and 1601b.

Figure 16:
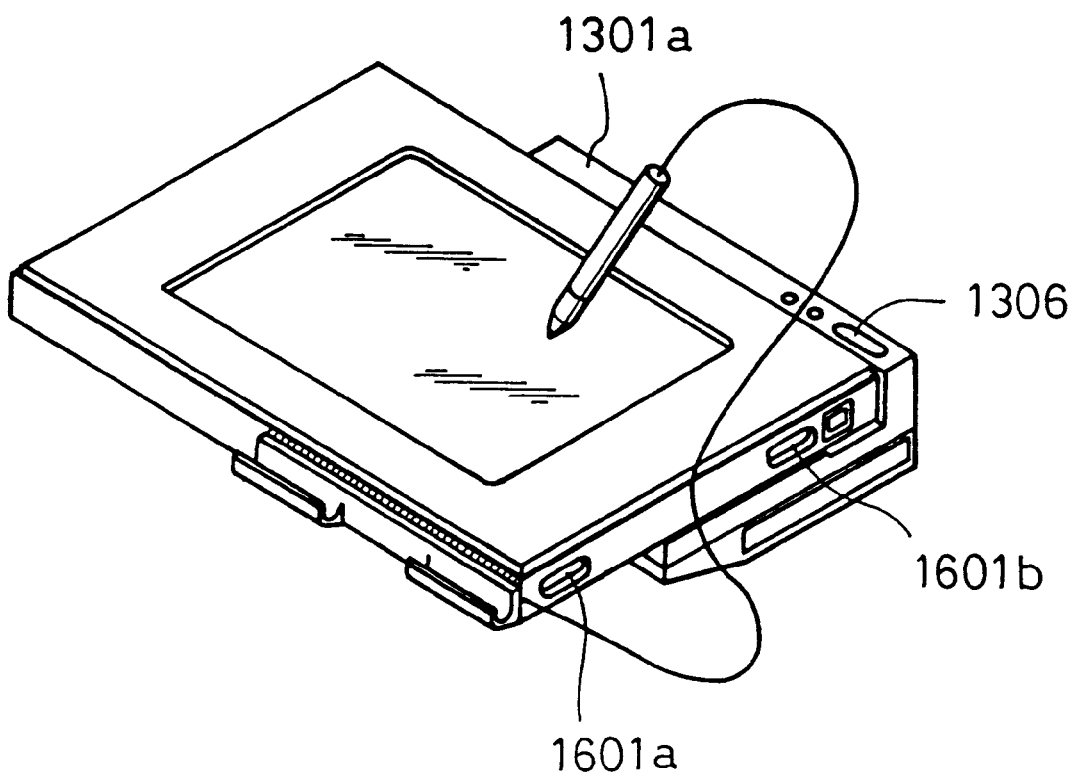
FIG. 16 is an external appearance view of another example of the operation of combining/separating the main and sub units.

The combining/separating operation in a case where the main unit is used in the widthwise position will be described below. In this case, the main unit is used after being positioned in such a manner that it is rotated clockwise by 90° from the longitudinal position. FIG. 16 shows a state of the main and sub units completely combined after being positioned in this manner. The left side surface of the main unit in the longitudinal position corresponds to the side surface of the main unit remote from the operator in the widthwise position. When the combining operation is completed, the side surface of the main unit remote from the operator in the longitudinal position (the right side surface in the widthwise position) is generally flush with the right side surface of the sub unit.

At the time of combining for setting the widthwise position, the positional relationship between the guide portions 1601a and 1601b and the guide pins 1308a and 1308b, the positional relationship between the recess 1002 of the main unit and the hook portion 1303 of the sub unit, the state and the combining operation of these parts are the same as those in the case of combining for setting the longitudinal position. That is, the arrangement is such that the positions of the guide portions 1601a and 1601b, the recess 1001 and other parts of the main unit functioning in the longitudinal state as viewed from a vertex at a right corner of the main unit remote from the operator when the longitudinal position is selected are the same as the positions of the guide portions 1601c and 1601d, the recess 1002 and other parts functioning in the widthwise state as viewed from a vertex at a right corner of the main unit remote from the operator when the widthwise position is selected. Also, when the main unit is combined with the sub unit in the widthwise position, the optical communication windows 1003a to 1003d in the bottom surface of the main unit coincide generally with the windows 1305d to 1305g of the sub unit forming a row in the widthwise direction of the main unit. The rows of windows 1305a to 1305g intersecting each other at right angles are arranged so that the point of this intersection coincides with the point of intersection of two straight lines which intersect, at 45°, the side of the main unit having vertexes at the right and left corners of the main unit in the longitudinal position. It is thereby possible to use the window 1305d at the point of intersection in common with respect to the longitudinal and widthwise positions. When the main and sub units in the combined state is placed on a horizontal plane, for example, on a desk, the input surface has a predetermined angle as in the case of the combined state in the longitudinal position. Also, the separating operation when the widthwise position is selected can be completed by pressing the release button 1306 of the sub unit to move the engagement knob 1304 downward to allow the predetermined movement, as in the case of the operation when the longitudinal position is selected.

In the above-described combining/separating operation, the projecting portion 1301a of the sub unit can be used as a suitable reference mark. Also, the operator can hold the projecting portion 1301a to relatively move the units. Thus, the combining/separating operation can be performed very easily.

Figure 26:
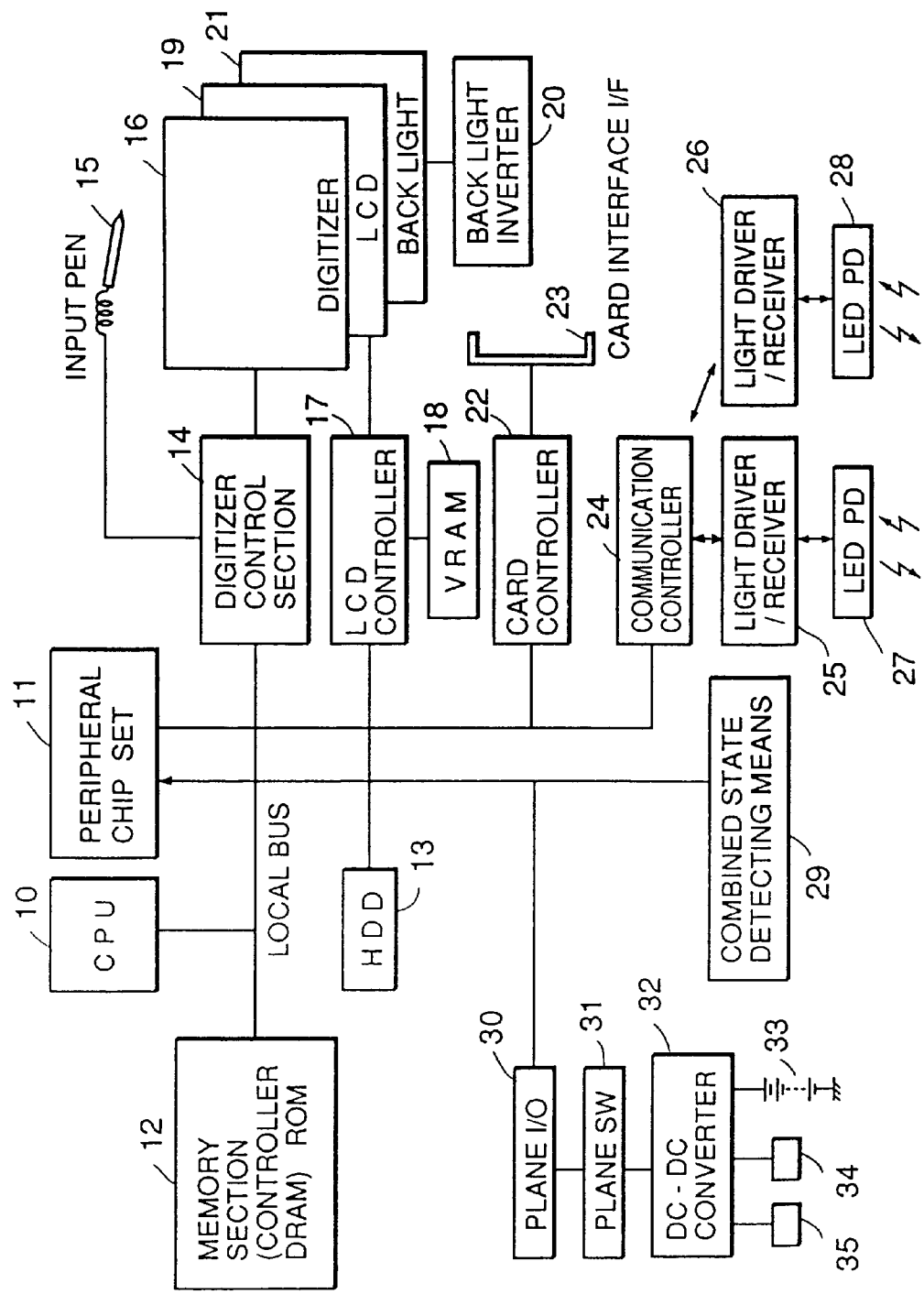
FIG. 26 is a block diagram of a main unit.

The overall electrical construction of this information processor will be described below with reference to FIG. 26. A CPU 10 is a 32-bit CPU, such a i80386SL, a product from Intel Corp., which executes programs for an operation I/O control and the like. A peripheral chip set 11 is used in combination with the CPU 10 to control necessary peripheral I/O processing (serial communication, parallel communication, real time clock, timer, interruption control, DRAM control and the like). A memory section 12 includes a main memory (DRAM: 8 MB), a cache (64 kB), and a boot ROM. The main memory is backed up in a suspended state and stores a control process executed by the CPU. A hard disk drive (HDD) has a 1.8 inch or 1.3 inch hard disk, and has a capacity of 20 to 80 MB for storing operating system data, application software data, user data and the like.

This embodiment is arranged as a pen computer to which data is input by operating a pen 15 on a digitizer 16 in the same manner as writing on paper. A locus of writing or an inputting result is displayed on a liquid crystal display (LCD) 19. The LCD 19 and the digitizer 16 are arranged by being superposed so that an input position and an output position can be recognized as equal to each other. The input precision of the digitizer 16 is not higher than the precision determined by dots of the LCD, e.g., 0.1 mm. A digitizer control section 14 controls the digitizer 16 and has an internal construction (not shown) formed of a CPU, a ROM, a RAM, a driver and other components. An LCD controller 17 successively accesses display data stored in a VRAM 18, transfers the data to the LCD 19 while taking gradations into account, and performs a bus control such that accessing to the VRAM 10 and accessing the data transferred to the LCD are preventing from falling on each other. Logical operations AND, OR, EXOR and the like of the content of the VRAM 18 with determined data may be performed (for example, by a VGA controller). A back light 21 is a light emitting device disposed at the back of the LCD 19 to enable the LCD 10 to be observed even in a room or a dark place. The back light may be of an electroluminescent type or a cold cathode lamp type. A back light inverter 20 is a driver for driving the light emitting device.

A card interface 23 is an interface capable of receiving memory cards, such as a ROM card for adding an application program or data, a ROM card for use as an extended memory or for a backup operation, and a flash card for a backup operation or adding data, and I/O cards, such as a facsimile data modem card for sending/receiving data through a telephone line and a local area network (LAN) card for connection to a network. The interface standard using a 68 pin type determined by JEIDA/PCMCIA is becoming dominant. A card controller 22 performs control processing (address change processing or the like) for writing or reading data from the CPU on a card or reading.

A communication controller 24 is a controller for data communication in the SDLC form. In a channel A, data for devices such as a keyboard, a floppy disk drive or a centro pertaining to nodes of the sub unit is transmitted or received. In a channel B, data is directly exchanged through the sub unit by a kind of network communication such as Local Talk. For communication through each of the channels A and B, a light driver/receiver 25 or 26 and a set of light emitting diodes (LED) and a photodiode (PD) 27 or 28 are provided. A DC—DC converter 32 converts a power IC supply voltage supplied from one of a battery 33, an AC adaptor jack 34 and connection electrodes 35 for connection with the sub unit into voltages used in the main unit (+5 V for logical circuit, +12 V for back light, −24 V for LCD).

Figure 27A:
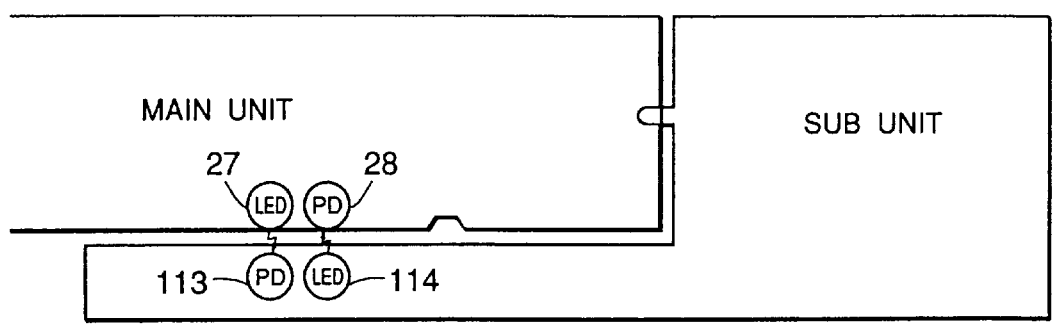
FIG. 27(a) is a cross-sectional view of a combined state of main and sub units.
Figure 27B:
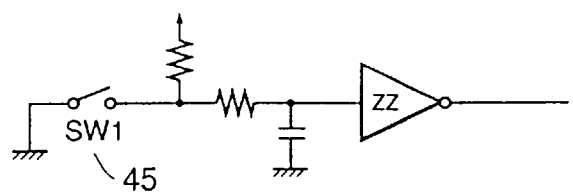
FIG. 27(b) is a diagram of a switch of the main unit.

FIGS. 27(a) and 27(b) show a combined state detecting means. FIG. 27(a) is a cross-sectional view when the main and sub units are combined. The CPU 10 is informed of whether the main and sub units are combined or separate by being supplied with a signal indicating that a hook portion 603 of the sub unit is pressing a switch of the main unit through a circuit such as that shown in FIG. 27(b). It is informed by interruption INT and can recognize the state from an I/O (not shown).

When the main and sub units are combined with each other, the LEDs and PDs for optical communication through channels A and B face corresponding elements of the sub units, thereby enabling non-contact communication. Also, electrodes 119 of the sub unit and the electrodes 35 of the main unit are brought into contact with each other for power supply.

FIG. 28 shows an electrical block diagram of the sub unit.

A CPU 100, peripheral chips 101 and a memory 102 serve to perform an overall electrical control. The sub unit contains devices, which are not incorporated in the main unit, i.e., a floppy disk drive (FDD), a keyboard, a centro interface and a network interface.

A floppy controller 103 controls a 3.5 inch floppy drive unit 104. A keyboard controller 105 for controlling the keyboard informs the CPU 100 of depressed keys on the keyboard. Data of the FDD and the keyboard is sent to the main unit through a communication controller 110. A centro driver 108 is an interface for outputting data from the CPU 100 to a printer or the like. The communication controller 110, light drivers/receivers 111 and 112, and sets of LEDs and PDs 113 and 114 are the same as those in the main unit.

A network interface 115 serves for conversion to a suitable voltage and a suitable impedance when the unit is connected to a network. In this embodiment, a signal in the main unit channel B is directly sent to a network.

A DC—DC converter 117 is a power source for the sub unit and is supplied with power through an AC adaptor shutter 120. A combined state detecting means 118, which is is the same as that described above, closes a switch 121 when the combined state is detected, and supplies a signal to the electrode 119 connected to the main unit in the combined state.

Figure 29:
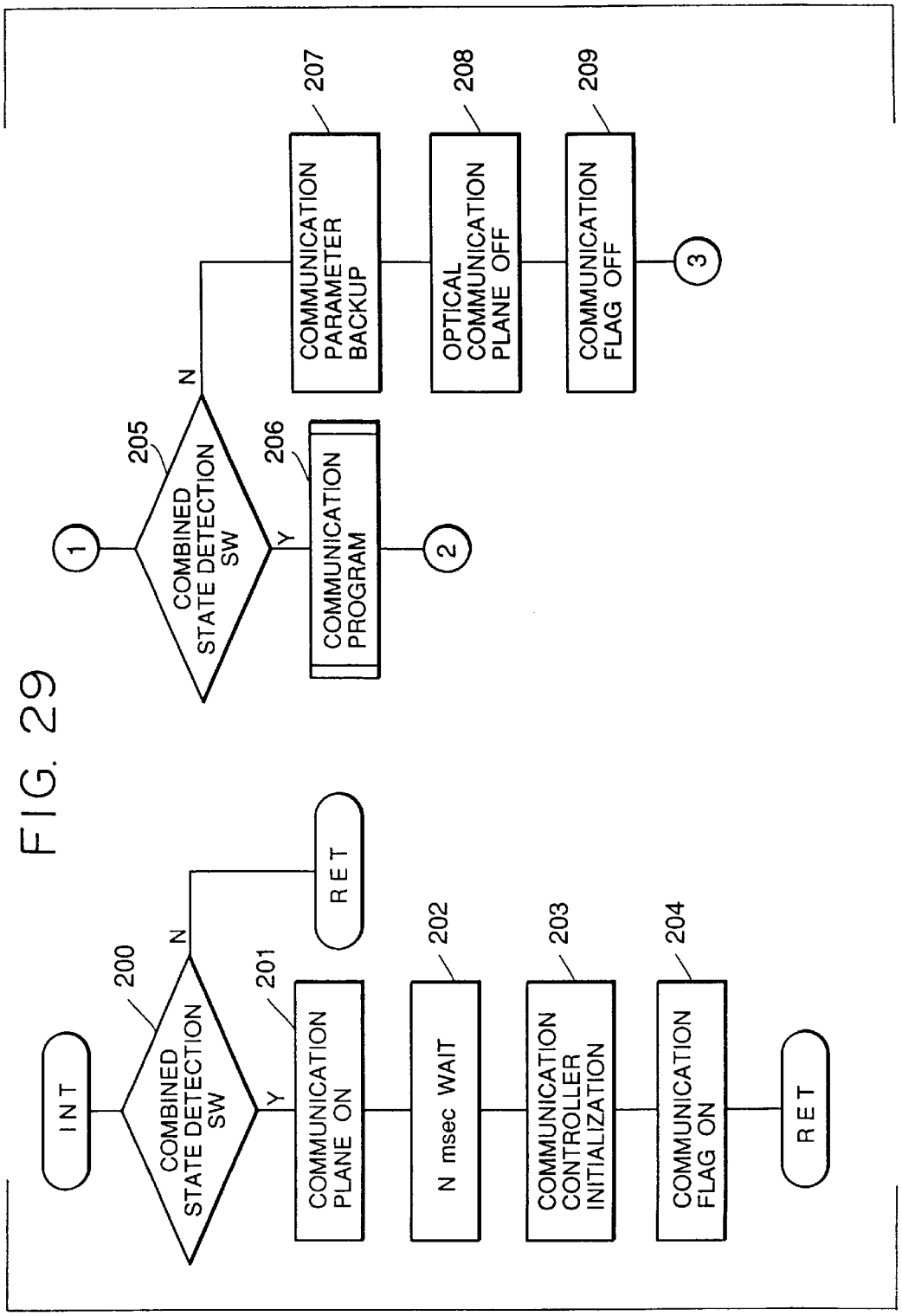
FIG. 29 is a flowchart of operating an optical communication plane.

FIG. 29 is a flowchart relating to turning on/off an optical communication plane in accordance with this embodiment. When the main and sub units are combined, the CPU 10 is interrupted by an interrupt signal. In an interruption routine, the state of the combined state detection switch is confirmed again in step 200. If the combined state is confirmed, the optical communication plane is turned on in step 201. That is, a fourth bit of a power supply plane I/O 30 is set to high level to turn on a switch 31. In step 202, passage of N msec is awaited before the power supply is stabilized. In step 203, the communication controller is initialized. In step 204, a communication flag is turned on, thereby completing the interruption routine. For ordinary communication, selecting is performed which is called for a certain time period only when the communication flag is on, and which is called according to polling or a necessary phase. First, in step ① 205, the combined state detection switch is confirmed. If the combined state is confirmed, a communication routine is started in step 206. If the combined state is not confirmed, it is determined that the main and sub units are separated, and parameters necessary for communication and other data are backed up in step 207. The optical communication plane is turned off in step 208, and the communication flag is turned off in step 209, thereby terminating the process.

The process does not proceed into the communication routine unless the communication flag is turned on in the combined state interruption routine.

When the power source is turned on, the confirmation of the combined state detection switch is effected during power supply initialization. If the combined state is thereby confirmed, the optical communication plane is turned on, the communication controller is initialized and the communication flag is turned on.

Figure 23:
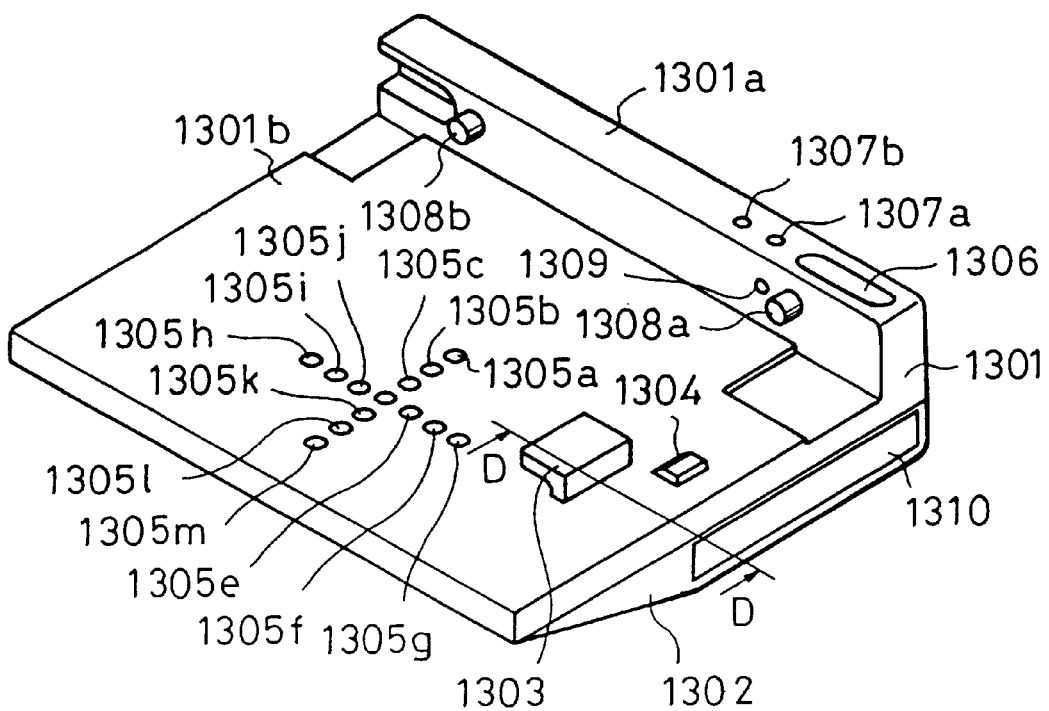
FIG. 23 is a diagram of an external appearance of a sub unit.
Figure 24:
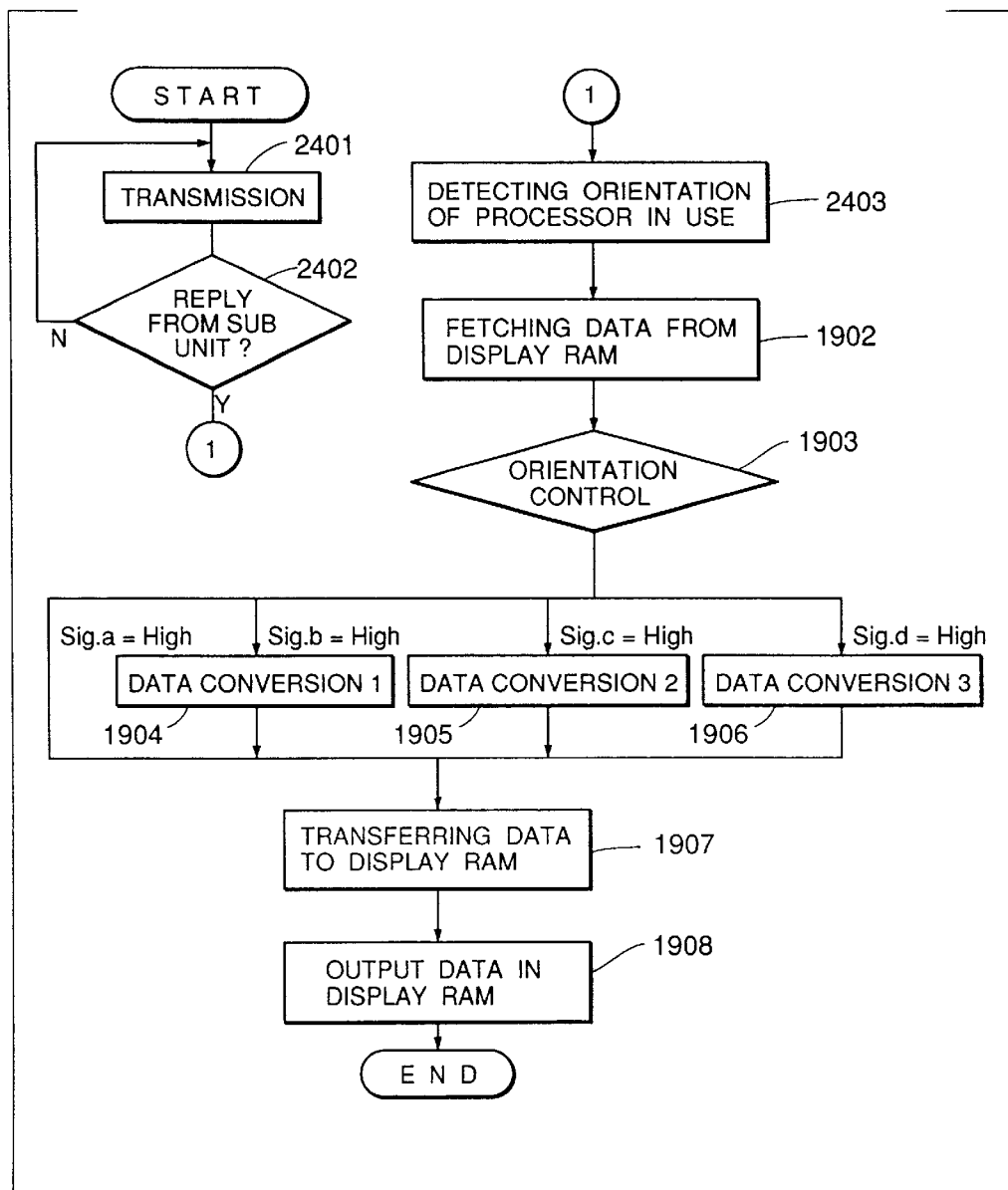
FIG. 24 is a diagram of a control process.

In the third embodiment, the detection of orientation of the processor in a used state is effected on the main unit side. Alternatively, it may be effected on the sub unit side in accordance with another embodiment. FIG. 23 shows an external appearance of a sub unit in accordance with this embodiment. Holes 1305h to 1305m are optical communication unit windows similar to the windows 1305a to 1305g. A process of changing the displayed picture orientation in accordance with this embodiment will be described with reference to FIGS. 24 and 25. FIG. 24 is a flowchart of the main unit. In step 2401, an orientation detection packet signal is sent to the sub unit through optical communication windows. Transmission of this packet signal is continued until an orientation control packet signal is sent from the sub unit in step 2402. In step 2403, the orientation control packet signal is analyzed to detect the orientation of the processor in a used state. Steps 1902 through 1908 show a picture display orientation changing process as discussed above with respect to FIG. 19.

Figure 25:
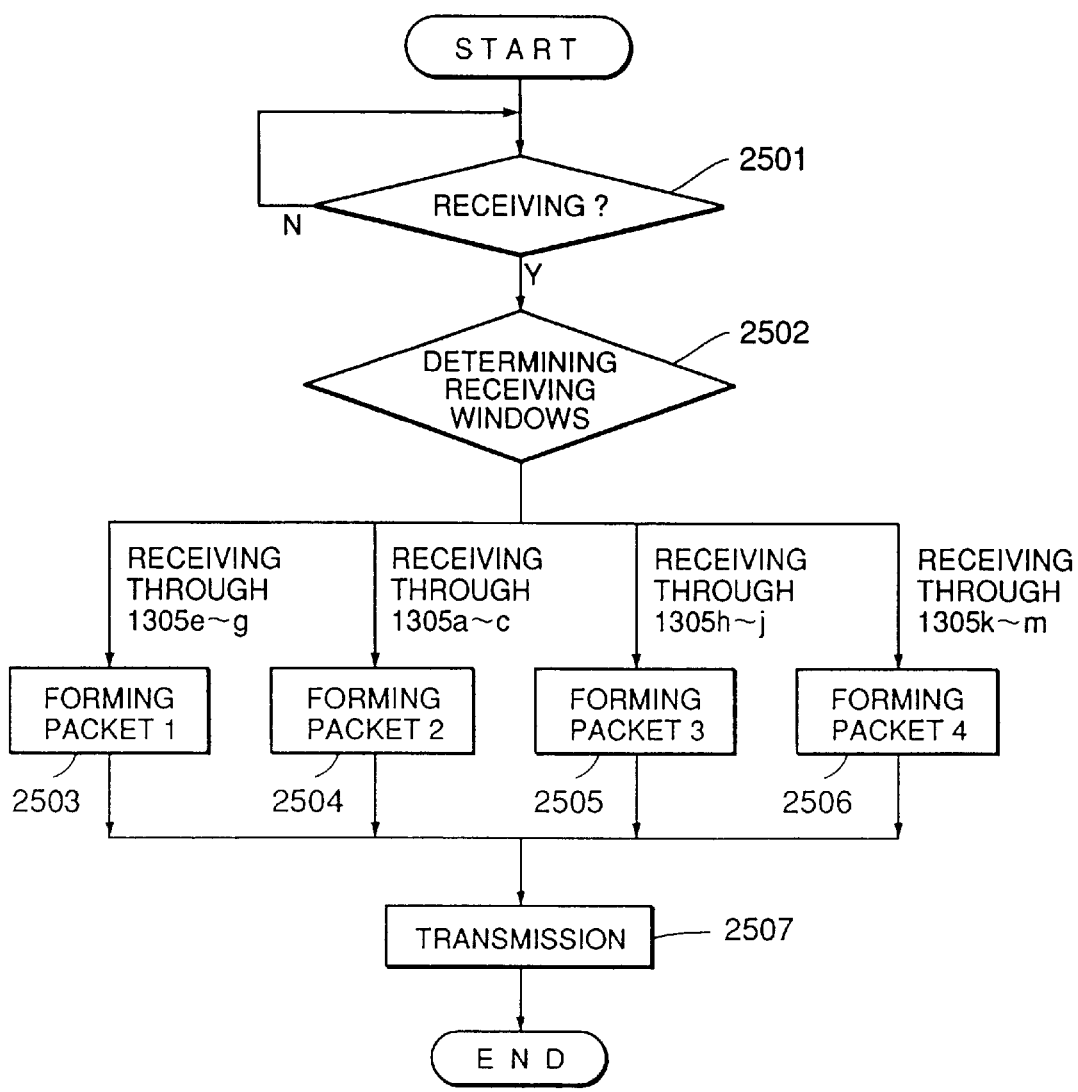
FIG. 25 is a diagram of a control process.

FIG. 25 is a flowchart of the sub unit. If a packet signal from the main unit is received through some of the optical communication windows 1305a to 1305m in step 2501, a packet signal corresponding to the optical communication windows through which the signal from the main unit has been received is formed in one of steps 2503 to 2506. Then, in step 2507, the formed packet signal is transmitted to the main unit through the optical communication windows through which the signal from the main unit has been received.

According to the present invention, as described above, the orientation of a picture on a display screen of an input-output integrated type information processor can be changed according to the orientation of the processor in a used state. It is therefore possible for an operator to use the processor with an optimal orientation. It is also possible for the operator to change the display orientation without performing a special operation for changing the display orientation. Thus, the processor is improved in handling.

While the present invention has been described with respect to what presently are considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An information processor comprising:

display means for displaying information;

a plurality of connection means for connecting an external apparatus to one of said plurality of connection means which are arranged at different positions on said display means;

detection means for detecting which of said plurality of connection means the external apparatus is connected to; and display control means for controlling a display form of information displayed on said display means in accordance with the result of the detection of said detection means, wherein the external apparatus comprises input means for inputting information, and each of said connection means is capable of receiving the same external apparatus.

2. An information processor according to claim 1, wherein said input means is a pen-type input means.

3. An information processor according to claim 1, wherein said display control means comprises control means for controlling vertical-horizontal change of the information displayed on said display means.

4. An information processor according to claim 1, wherein said display means is superposed on a digitizer.

5. An information processor according to claim 1, wherein the input means for inputting information is connected to only one of said plurality of connection means.

6. An information processor according to claim 5, wherein said detection means detects which one of said plurality of connection means the external apparatus is connected to.

7. An information processor according to claim 6, wherein said display control means controls a picture display orientation on said display means in accordance with the result of the detection of said detection means.

8. An information processor comprising:

display means for displaying a picture;

a plurality of connection means for connecting an external apparatus to one of said plurality of connection means which are arranged at different positions on said display means;

detection means for detecting which of said plurality of connection means the external apparatus is connected to; and display control means for controlling a display form of the picture displayed on said display means in accordance with the result of the detection of said detection means, wherein the external apparatus comprises input means for inputting information, and each of said connection means is capable of receiving the same external apparatus.

9. An information processor according to claim 8, wherein said input means is a pen-type input means.

10. An information processor according to claim 8, wherein said display control means comprises control means for controlling vertical-horizontal change of the information displayed on said display means.

11. An information processor according to claim 8, wherein said display means is superposed on a digitizer.

12. An information processor according to claim 8, wherein the input means for inputting information is connected to only one of said plurality of connection means.

13. An information processor according to claim 8, wherein said detection means detects which one of said plurality of connection means the external apparatus is connected.

14. An information processor according to claim 8, wherein said display control means controls a picture display orientation on said display means in accordance with the result of the detection of said detection means.

15. An information processing method comprising the steps of:

providing a display with a plurality of connection means arranged at different positions for receiving an external apparatus;

detecting a connection signal indicating that the external apparatus is connected to one of the connection means; and controlling the display form of information to be displayed in accordance with the result of the detection of the detecting step, wherein each of the connection means provided is capable of receiving the same external apparatus, and the external apparatus is an input for inputting information to the display.

16. An information processing method according to claim 15, further comprising the step of providing a pen-type input as the input for inputting information to the display.

17. An information processing method according to claim 15, further comprising the step of providing the display with a control for controlling vertical-horizontal change of the information displayed on the display.

18. An information processing method according to claim 15, wherein the display is superposed on a digitizer.

19. An information processor comprising:

display means for displaying information, said display means having length and width dimensions;

a plurality of connection means for connecting an external apparatus to one of said plurality of connection means which are arranged at different positions on said display means;

detection means for detecting which of said plurality of connection means the external apparatus is connected to; and display control means for controlling a display form of information displayed on said display means in accordance with the result of the detection of said detection means and the ratio between the length and width of said display means, wherein the external apparatus comprises input means for inputting information, and each of said connection means is capable of receiving the same external apparatus.

20. An information processor according to claim 19, wherein said input is a pen-type input means.

21. An information processor according to claim 19, wherein said display control means comprises control means for controlling vertical-horizontal change of the information displayed on said display means.

22. An information processor according to claim 19, wherein said display means is superposed on a digitizer.

23. An information processor according to claim 19, wherein the input means for inputting information is connected to only one of said plurality of connection means.

24. An information processor according to claim 23, wherein said detection means detects which one of said plurality of connection means the external apparatus is connected.

25. An information processor according to claim 24, wherein said display control means controls a picture display orientation on said display means in accordance with the result of the detection of said detection means.

26. An information processing method comprising the steps of:
- providing a display with a plurality of connection means arranged at different positions for receiving an external apparatus, with the display having length and width dimensions;
- detecting a connection signal indicating that the external apparatus is connected to one of the connection means; and
- controlling the display form of information to be displayed in accordance with the result of the detection of the detecting step and the ratio between the length and width of the display, wherein
- each of the connection means provided is capable of receiving the same external apparatus, and the external apparatus is an input for inputting information to the display.

27. An information processing method according to claim 26, further comprising the step of providing a pen-type input as the input for inputting information to the display.

28. An information processing method according to claim 26, further comprising the step of providing the display with a control for controlling vertical-horizontal change of the information displayed on the display.

29. An information processing method according to claim 26, wherein the display is superposed on a digitizer.

30. An information processor comprising:

display means for displaying information, said display means having length and width dimensions;

a plurality of connection means for connecting an external apparatus to one of said plurality of connection means which are arranged at different positions on said display means;

detection means for detecting which of said plurality of connection means the external apparatus is connected to; and display control means for controlling a display form of information displayed on said display means in accordance with the result of the detection of said detection means and the ratio between the length and width of said display means, wherein each of said connection means is capable of receiving the same external apparatus.

* * * * *

UNITED STATES PATENT AND TRADEMARK OFFICE
CERTIFICATE OF CORRECTION

PATENT NO. : 5,936,619

DATED : August 10, 1999

INVENTOR(S): KATSUHIKO NAGASAKI, ET AL.

It is certified that error appears in the above-identified patent and that said Letters Patent is hereby corrected as shown below:

COLUMN 14:

Line 17, "connected." should read --connected to.--.

COLUMN 15:

Line 12, "connected." should read --connected to--.

Signed and Sealed this

Thirty-first Day of October, 2000

Attest:

Q. TODD DICKINSON

Attesting Officer      Director of Patents and Trademarks